US012032964B2

(12) United States Patent
Eisner et al.

(10) Patent No.: US 12,032,964 B2
(45) Date of Patent: Jul. 9, 2024

(54) SPECULATIVE EXECUTION OF DATAFLOW PROGRAM NODES

(71) Applicant: Microsoft Technology Licensing, LLC, Redmond, WA (US)

(72) Inventors: Jason Michael Eisner, Baltimore, MD (US); Samuel McIntire Thomson, Berkeley, CA (US); Michael Jack Newman, Somerville, MA (US); Emmanouil Antonios Platanios, Fremont, CA (US); Jiawei Zhou, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/815,904

(22) Filed: Jul. 28, 2022

(65) Prior Publication Data

US 2023/0367602 A1    Nov. 16, 2023

Related U.S. Application Data

(60) Provisional application No. 63/368,131, filed on Jul. 11, 2022, provisional application No. 63/364,702, filed on May 13, 2022.

(51) Int. Cl.
*G06F 9/38* (2018.01)
*G06F 9/30* (2018.01)

(52) U.S. Cl.
CPC .......... *G06F 9/3842* (2013.01); *G06F 9/3001* (2013.01); *G06F 9/3005* (2013.01)

(58) Field of Classification Search
CPC ..... G06F 9/3001; G06F 9/3005; G06F 9/3842
See application file for complete search history.

(56) References Cited

U.S. PATENT DOCUMENTS

| | | | |
|---|---|---|---|
| 2016/0148610 A1* | 5/2016 | Kennewick, Jr. | ....... G10L 15/18 704/240 |
| 2020/0074993 A1 | 3/2020 | Lee et al. | |
| 2021/0027771 A1 | 1/2021 | Hall et al. | |

OTHER PUBLICATIONS

Ambati, et al., "An Incremental Algorithm for Transition-based CCG Parsing", In Proceedings of the Conference of the North American Chapter of the Association for Computational Linguistics: Human Language Technologies, May 31, 2015, pp. 53-63.
Anderson, et al., "SPICE: Semantic Propositional Image Caption Evaluation", In Proceedings of the 14th European Conference on Computer Vision, Part V, vol. 9909, Oct. 11, 2016, 17 Pages.

(Continued)

*Primary Examiner* — Zachary K Huson
(74) *Attorney, Agent, or Firm* — Alleman Hall & Tuttle LLP

(57) ABSTRACT

A computer-implemented method is presented. The method comprises sequentially receiving a plurality of utterance prefixes, each sequentially received utterance prefix derived from a progressively longer incomplete portion of a full user utterance. For each sequentially received utterance prefix, a complete dataflow program is predicted based on the utterance prefix. The complete dataflow program includes a plurality of program nodes to be executed to satisfy the full user utterance. One or more program nodes are selected from the predicted complete dataflow program to speculatively execute based on at least the utterance prefix.

20 Claims, 10 Drawing Sheets

(56) References Cited

OTHER PUBLICATIONS

Andreas, et al., "Task-Oriented Dialogue as Dataflow Synthesis", In Transactions of the Association for Computational Linguistics, vol. 8, Sep. 1, 2020, pp. 556-571.
Applegate, et al., "A Computational Study of the Job-Shop Scheduling Problem", In Journal of ORSA on Computing, vol. 3, Issue 2, May 1, 1991, pp. 149-156.
Arivazhagan, et al., "Monotonic Infinite Lookback Attention for Simultaneous Machine Translation", In Proceedings of the 57th Annual Meeting of the Association for Computational Linguistics, Jul. 28, 2019, pp. 1313-1323.
Arivazhagan, et al., "Re-Translation Strategies for Long Form, Simultaneous, Spoken Language Translation", In Proceedings of the IEEE International Conference on Acoustics, Speech and Signal Processing, May 4, 2020, pp. 7919-7923.
Arivazhagan, et al., "Re-Translation versus Streaming for Simultaneous Translation", In Proceedings of the 17th International Conference on Spoken Language Translation, Jul. 9, 2020, pp. 220-227.
Banarescu, et al., "Abstract Meaning Representation for Sembanking", In Proceedings of the 7th Linguistic Annotation Workshop & Interoperability with Discourse, Aug. 8, 2013, pp. 178-186.
Cheng, et al., "Conversational Semantic Parsing for Dialog State Tracking", In Proceedings of the Conference on Empirical Methods in Natural Language Processing, Nov. 16, 2020, pp. 8107-8117.
Cherry, et al., "Thinking Slow about Latency Evaluation for Simultaneous Machine Translation", In Repository of arXiv:1906.00048v1, May 31, 2019, 7 Pages.
Cho, et al., "Can Neural Machine Translation do Simultaneous Translation?", In Repository of arXiv:1606.02012v1, Jun. 7, 2016, 9 Pages.
Clark, et al., "Wide-Coverage Efficient Statistical Parsing with CCG and Log-Linear Models", In Journal of Computational Linguistics, vol. 33, Issue 4, Dec. 1, 2007, pp. 493-552.
Damonte, et al., "An Incremental Parser for Abstract Meaning Representation", In Proceedings of the 15th Conference of the European Chapter of the Association for Computational Linguistics: vol. 1, Long Papers, Apr. 3, 2017, pp. 536-546.
Deng, et al., "Prefix-to-SQL: Text-to-SQL Generation from Incomplete User Questions", In Repository of arXiv:2109.13066v3, Sep. 30, 2021, 17 Pages.
Earley, Jay, "An Efficient Context-Free Parsing Algorithm", In Communications of the ACM, vol. 13, Issue 2, Feb. 1, 1970, pp. 94-102.
Fang, et al., "Lispress", Retrieved From: https://github.com/microsoft/task_oriented_dialogue_as_dataflow_synthesis/blob/master/README-LISPRESS.md, Jun. 16, 2021, 3 Pages.
Fang, et al., "Task-Oriented Dialogue as Dataflow Synthesis", Retrieved From: https://github.com/microsoft/task_oriented_dialogue_as_dataflow_synthesis, Feb. 23, 2022, 10 Pages.
Grissom, et al., "Don't Until the Final Verb Wait: Reinforcement Learning for Simultaneous Machine Translation", In Proceedings of the Conference on Empirical Methods in Natural Language Processing, Oct. 25, 2014, pp. 1342-1352.
Gu, et al., "Learning to Translate in Real-time with Neural Machine Translation", In Proceedings of the 15th Conference of the European Chapter of the Association for Computational Linguistics: vol. 1, Long Papers, Apr. 3, 2017, pp. 1053-1062.
Han, et al., "Faster Re-translation Using Non-Autoregressive Model For Simultaneous Neural Machine Translation", In Repository of arXiv:2012.14681v2, Jun. 2, 2021, 8 Pages.
Huang, et al., "Dynamic Programming for Linear-Time Incremental Parsing", In Proceedings of the 48th Annual Meeting of the Association for Computational Linguistics, Jul. 11, 2010, pp. 1077-1086.
Jaitly, et al., "An Online Sequence-to-Sequence Model Using Partial Conditioning", In 30th Conference on Advances in Neural Information Processing Systems, vol. 29, Dec. 5, 2016, 9 Pages.
Lewis, et al., "BART: Denoising Sequence-to-Sequence Pre-training for Natural Language Generation, Translation, and Comprehension", In Proceedings of the 58th Annual Meeting of the Association for Computational Linguistics, Jul. 5, 2020, pp. 7871-7880.
Liu, et al., "RoBERTa: A Robustly Optimized BERT Pretraining Approach", In Repository of arXiv:1907.11692v1, Jul. 26, 2019, 13 Pages.
Ma, et al., "STACL: Simultaneous Translation with Implicit Anticipation and Controllable Latency using Prefix-to-Prefix Framework", In Repository of arXiv:1810.08398v5, Jun. 24, 2019, 12 Pages.
Ott, et al., "FAIRSEQ: A Fast, Extensible Toolkit for Sequence Modeling", In Proceedings of the North American Chapter of the Association for Computational Linguistics: Human Language Technologies, Jun. 2, 2019, pp. 48-53.
Papineni, et al., "Bleu: A Method for Automatic Evaluation of Machine Translation", In Proceedings of the 40th Annual Meeting on Association for Computational Linguistics, Jul. 6, 2002, pp. 311-318.
Platanios, et al., "Value-Agnostic Conversational Semantic Parsing", In Proceedings of the 59th Annual Meeting of the Association for Computational Linguistics and the 11th International Joint Conference on Natural Language Processing (vol. 1: Long Papers), Aug. 1, 2021, pp. 3666-3681.
Satija, et al., "Simultaneous Machine Translation Using Deep Reinforcement Learning", In Proceedings of ICML Workshop on Abstraction in Reinforcement Learning, Jun. 24, 2016, 6 Pages.
Tang, et al., "Using Multiple Clause Constructors in Inductive Logic Programming for Semantic Parsing", In Proceedings of European Conference on Machine Learning, Sep. 5, 2001, pp. 466-477.
Urban, et al., "What is the Speech CLI?", Retrieved From: https://docs.microsoft.com/en-us/azure/cognitive-services/speech-service/spx-overview, Feb. 20, 2022, 2 Pages.
Vaswani, et al., "Attention Is All You Need", In Proceedings of the 31st Conference on Neural Information Processing Systems, Dec. 4, 2017, 11 Pages.
Wahlster, Wolfgang, "Verbmobil: Translation of Face-To-Face Dialogs", In Proceedings of Basics and Applications of Artificial Intelligence, Sep. 13, 1993, 8 Pages.
Yin, et al., "A Syntactic Neural Model for General-Purpose Code Generation", In Proceedings of the 55th Annual Meeting of the Association for Computational Linguistics (vol. 1: Long Papers), Jul. 30, 2017, pp. 440-450.
Yu, et al., "Online Segment to Segment Neural Transduction", In Proceedings of the Conference on Empirical Methods in Natural Language Processing, Nov. 1, 2016, pp. 1307-1316.
Yu, et al., "Spider: A Large-Scale Human-Labeled Dataset for Complex and Cross-Domain Semantic Parsing and Text-to-SQL Task", In Proceedings of the Conference on Empirical Methods in Natural Language Processing, Oct. 31, 2018, pp. 3911-3921.
Zettlemoyer, et al., "Learning Context-Dependent Mappings from Sentences to Logical Form", In Proceedings of the Joint Conference of the 47th Annual Meeting of the ACL and the 4th International Joint Conference on Natural Language Processing of the AFNLP, Aug. 2, 2009, pp. 976-984.
Zettlemoyer, et al., "Learning to Map Sentences to Logical Form: Structured Classification with Probabilistic Categorial Grammars", In Proceedings of Twenty-First Conference on Uncertainty in Artificial Intelligence, Jul. 26, 2005, 9 Pages.
Zhou, et al., "AMR Parsing with Action-Pointer Transformer", In Proceedings of the Conference of the North American Chapter of the Association for Computational Linguistics: Human Language Technologies, Jun. 6, 2021, pp. 5585-5598.
Zhou, et al., "Online Semantic Parsing for Latency Reduction in Task-Oriented Dialogue", In Proceedings of the 60th Annual Meeting of the Association for Computational Linguistics (vol. 1: Long Papers), May 22, 2022, pp. 1554-1576.
Zhou, et al., "Structure-Aware Fine-Tuning of Sequence-to-Sequence Transformers for Transition-based AMR Parsing", In Proceedings of the Conference on Empirical Methods in Natural Language Processing, Nov. 7, 2021, pp. 6279-6290.

(56) References Cited

OTHER PUBLICATIONS

"International Search Report and Written Opinion Issued in PCT Application No. PCT/US2023/013449", dated Jun. 6, 2023, 14 Pages.

* cited by examiner

FIG. 1E

CONTEXT-SPECIFIC DIALOGUE HISTORY 130

CONCEPT 130A

CONCEPT 130B

⋮

CONCEPT 130N

USER UTTERANCE 102'

"When is my next meeting with Tom Jones?"

DATA-FLOW PROGRAM 106'

```
[events] = Find(Event(attendees: includes(Person(name: "Tom Jones"))))
[time] = [events][0].start
describe([time])
```

RESPONSE 120'

"At 12:30"

SPECULATIVE EXECUTION OF DATAFLOW PROGRAM NODES

CROSS REFERENCE TO RELATED APPLICATIONS

This application claims priority to U.S. Provisional Patent Applications Ser. No. 63/364,702, filed May 13, 2022, and Ser. No. 63/368,131, filed Jul. 11, 2022, the entirety of each of which is hereby incorporated herein by reference for all purposes.

BACKGROUND

Conversational systems process user utterances and respond by automatically performing actions, such as answering questions, invoking application programming interfaces (APIs), or otherwise assisting a user based on the user utterances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer-implemented method is presented. The method comprises sequentially receiving a plurality of utterance prefixes, each sequentially received utterance prefix derived from a progressively longer incomplete portion of a full user utterance. For each sequentially received utterance prefix, a complete dataflow program is predicted based on the utterance prefix. The complete dataflow program includes a plurality of program nodes to be executed to satisfy the full user utterance. One or more program nodes are selected from the predicted complete dataflow program to speculatively execute based on at least the utterance prefix.

BRIEF DESCRIPTION OF THE DRAWINGS

FIG. 1E shows an example dialogue between a user and an automated assistant.

DETAILED DESCRIPTION

Figure 1A:
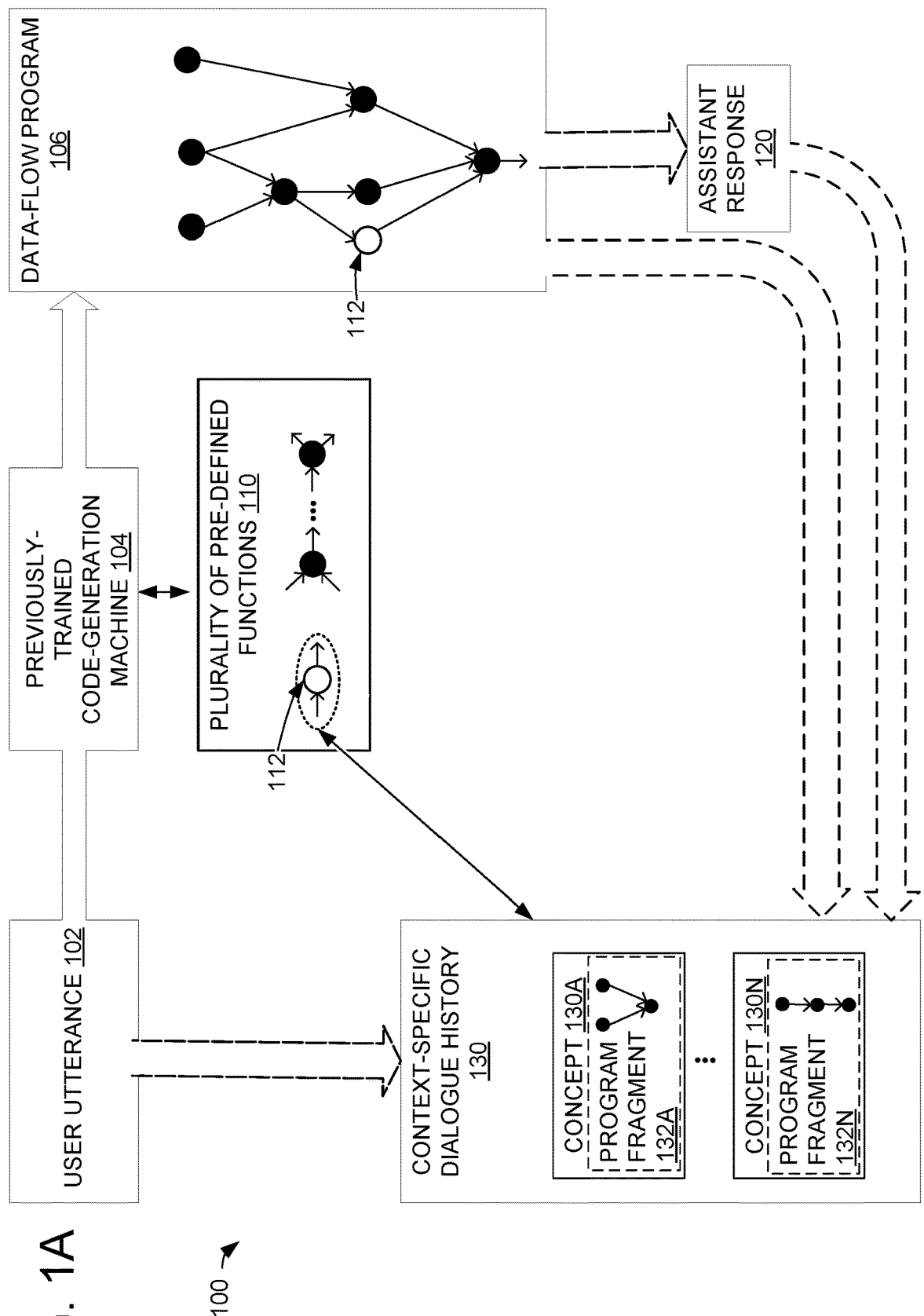
FIGS. 1A-1D show an example data-flow architecture for an automated assistant.

Conversational computing interfaces may be used to interact with users via natural language, for example via speech. Although the present disclosure uses an automated assistant as an example conversational computing interface, this example is non-limiting and conversational computing interfaces may be implemented according to the present disclosure for any suitable purpose, for example, to permit a user to use natural language to interact with any suitable computer hardware and/or computer software. As such, every reference to an automated assistant in the present disclosure applies equally to any other conversational computer interface or other computing framework configured to respond to speech.

Automated assistants can use natural language processing (NLP) techniques to process an input user utterance, e.g., user speech, in order to perform a predefined, hard-coded action related to the input user utterance. For example, an automated assistant may support a predefined plurality of hard-coded templates, where each template has a number of slots that can be filled to parametrize a hard-coded action. As an example, an automated assistant may support a predefined interaction to invoke an application programming interface (API), e.g., to reserve a seat at a restaurant, call a ride-hailing service, or look up the weather. However, although automated assistants may support a plurality of different predefined actions via the predefined templates, an automated assistant that only supports predefined actions via templates may not be configured to perform more complex or novel behaviors.

The present disclosure is directed to an automated assistant that processes user utterances using data-flow programs in a data-flow programming language, e.g., in addition to or instead of using templates. The automated assistant uses a previously-trained code generation machine to generate and/or output a data-flow program for a user utterance. The data-flow program uses a plurality of pre-defined functions to define individual steps for processing the user utterance. As used herein, data-flow programs are used synonymously with dataflow graphs.

Processing user utterances by using data-flow programs generated by a previously-trained code generation machine may result in an improved user experience, improved efficiency of an automated assistant or other interactive computer service, e.g., improved storage usage and/or improved processing time, and/or improved ability for responding to different user utterances. As an example, the data-flow programs may encode a variety of different processing strategies for different user utterances, including performing calculations based on the user utterances, accessing APIs to respond to the user utterances, etc. The code generation machine may generate data-flow programs that are specific to a user utterance being processed, which may enable processing the user utterance more efficiently (e.g., without performing irrelevant steps) and with improved user satisfaction (e.g., by generating programs that better address requests expressed in the user utterance).

Accordingly, FIG. 1A shows a data-flow architecture for an automated assistant system 100. Automated assistant system 100 is configured to process a user utterance 102 by operating a previously-trained code-generation machine 104 configured to output a data-flow program 106 for the user utterance 102. Although the present disclosure focuses on interaction via natural language, e.g., speech, conversational computing interfaces such as automated assistant system 100 may further permit interaction via any other suitable input methods, for example, via touch screen inputs and/or button presses. Similarly, although the present disclosure focuses on processing a user utterance 102, other inputs such as button press events may be processed in similar fashion. For example, previously-trained code-generation machine 104 may be configured to output a data-flow program 106 for one or more button press event(s) supplementing user speech. Previously-trained code generation machine 104 may be trained to recognize different kinds of non-linguistic input events, e.g., based on a specific button being pressed, timing of the button press relative to other input events, etc.

Data-flow program 106 is shown as a graph including a plurality of function nodes, wherein the function nodes are depicted with inputs and outputs shown by edges/arrows. The data-flow program 106 is configured to produce a return value indicated by the bottom-most arrow. Previously-trained code-generation machine 104 is configured to add any of a plurality of pre-defined functions 110 to the data-flow program based on the user utterance. Each pre-defined function defines one or more individual steps for processing the user utterance 102. The data-flow program 106 is executable to cause the automated assistant to respond to the user utterance, for example by performing any suitable response action. The pre-defined functions of the data-flow program 106 may be executable to cause the automated assistant to perform any suitable response action, for example, outputting a response as speech and/or text, e.g., outputting an assistant response 120 as shown in FIG. 1A, and/or invoking an API to perform an action using the API, e.g., ordering food from a restaurant, scheduling a ride with a ride-hailing service, scheduling a meeting in a calendar service, placing a phone call. Although the present disclosure focuses on examples in which the automated assistant responds to utterances by outputting an assistant response, e.g., as speech and/or text, these examples are non-limiting and the pre-defined functions and data-flow programs described herein may be configured to cause the automated assistant to respond to utterances in any suitable manner, for example by performing one or more actions using an API instead of or in addition to outputting an assistant response.

The previously-described code-generation machine 104 described herein may be used to respond to user utterances in any suitable fashion. For example, the previously-described code-generation machine 104 may be configured to recognize a user utterance, and produce, from the user utterance, a data-flow program that defines an executable plan for responding to the user utterance. The resulting data-flow program may be executed, for example by an automated assistant, to process the user utterance. In some examples, the data-flow program for responding to the user utterance may be executed to respond to the user utterance without needing to generate any additional code using the code-generation machine 104. In other words, code-generation machine 104 is configured to output a complete plan for processing a user utterance. Alternately or additionally, code-generation machine 104 may be configured to output a data-flow program for responding to a user utterance, wherein some or all of the data-flow program is executed before code-generation machine 104 is used to generate further code defining a further plan for completing processing of the user utterance. Code-generation machine 104 may be used to plan and execute data-flow programs in any suitable fashion, including completing planning before execution and/or interleaving planning and execution in any suitable fashion.

The previously-trained code-generation machine 104 may be based on any suitable technology, such as state-of-the-art or future machine learning (ML), artificial intelligence (AI), and/or natural language processing (NLP) technologies. In some examples, the previously-trained code-generation machine 104 includes an encoder machine configured to encode the user utterance 102 as a semantic feature, e.g., a vector in a semantic vector space learned by the previously-trained code-generation machine 104 and a decoder machine configured to decode the semantic feature by outputting one or more functions from the plurality of pre-defined functions 110. In some examples, the decoder machine is configured to output the one or more functions according to a typed grammar for composing functions from the plurality of pre-defined functions 110, thereby constraining the outputs of the decoder machine to be well-typed, fully-executable data-flow programs. The plurality of pre-defined, composable functions 110 supports a range of different automated assistant behaviors, e.g., invoking APIs, answering questions, looking up data, and/or utilizing historical context from a context-specific dialogue history 130 maintained for the automated assistant. As shown by the dashed arrows in FIG. 1A, the context-specific dialogue history 130 may include any suitable aspects of the dialogue, for example user utterance 102, data-flow program 106, and/or a resulting assistant response 120.

Accordingly, the user utterance 102, data-flow program 106 generated for the user utterance 102, and/or any relevant assistant response 120 by the automated assistant may be stored in the context-specific dialogue history 130. Accordingly, the context-specific dialogue history 130 defines a plurality of concepts, e.g., concepts 130A through 130N. "Concept" is used herein to refer to any relevant or potentially relevant aspects of the interaction between the user and the automated assistant. For example, a concept may include an entity (e.g., a person, place, thing, number, date), an intent of a user query (e.g., an intent to order food, an intent to look up the weather, an intent to schedule a meeting), an action performed by the automated assistant (e.g., ordering food, looking up the weather, invoking an API, looking up information pertaining to an entity, recognizing a specific user utterance, performing a composite action composed of more than one action), or any other suitable feature. A concept may be defined in any suitable manner, for example based on text content of the user utterance 102. In some examples, a concept 130A is defined in terms of a data-flow program fragment 132A. For example, the data-flow program fragment 132A may include one or more functions configured to look up information pertaining to a specific entity, and/or one or more functions configured to cause the automated assistant to perform a specific action.

In some examples, the plurality of pre-defined functions 110 includes one or more history-accessing functions configured to access the context-specific dialogue history 130. Accordingly, data-flow program 106 may include such history-accessing functions. For example, the plurality of pre-defined functions 110 and data-flow program 106 each include a history-accessing function 112 configured to access the context-specific dialogue history 130 as shown by the arrow. In some examples, the plurality of pre-defined functions 110 includes a search-history function configured to look up a concept from the context-specific dialogue history 130, e.g., a getSalient( ) function configured to look up an entity that was previously discussed, or to look up an action that was previously performed. In some examples, the plurality of pre-defined functions 110 includes a program-rewriting function parametrized by a designated concept stored in the context-specific dialogue history and configured to generate a new data-flow program fragment related to the designated concept based on concepts from context-specific dialogue history 130, e.g., a Clobber( ) function configured to generate a new, re-written program based on the designated concept, for example, to write a new program for performing a previous action with regard to a new entity, or for performing a new action with regard to a previously-discussed entity. In some examples, the designated concept stored in the context-specific dialogue history includes a target sub-concept, and the program-rewriting function is further parametrized by a replacing sub-concept for replacing the target sub-concept. Accordingly, the new data-flow program fragment corresponds to the designated concept with the target sub-concept being replaced by the replacing sub-concept. In particular, in some examples, the new data-flow program fragment includes a rewritten data-flow program fragment, based on a historical data-flow program fragment corresponding to the designated concept, wherein a sub-program fragment corresponding to the target sub-concept is replaced by a different sub-program fragment corresponding to the replacing sub-concept.

By looking up and/or rewriting concepts from context-specific dialogue history 130, the automated assistant may be able to repeat actions, perform actions with modifications, look up relevant entities or other details related to previous actions, etc. For example, the automated assistant may repeat an action or perform an action with modifications, by re-executing code based on a program fragment 132A corresponding to a concept 130A from the context-specific dialogue history 130. Furthermore, if any error condition is reached during execution of data-flow program 106 prior to outputting an assistant response 120, the data-flow program 106 and/or other program fragments stored in context-specific dialogue history 130 may be re-executed either with or without modifications to recover from the error.

Figure 1B:
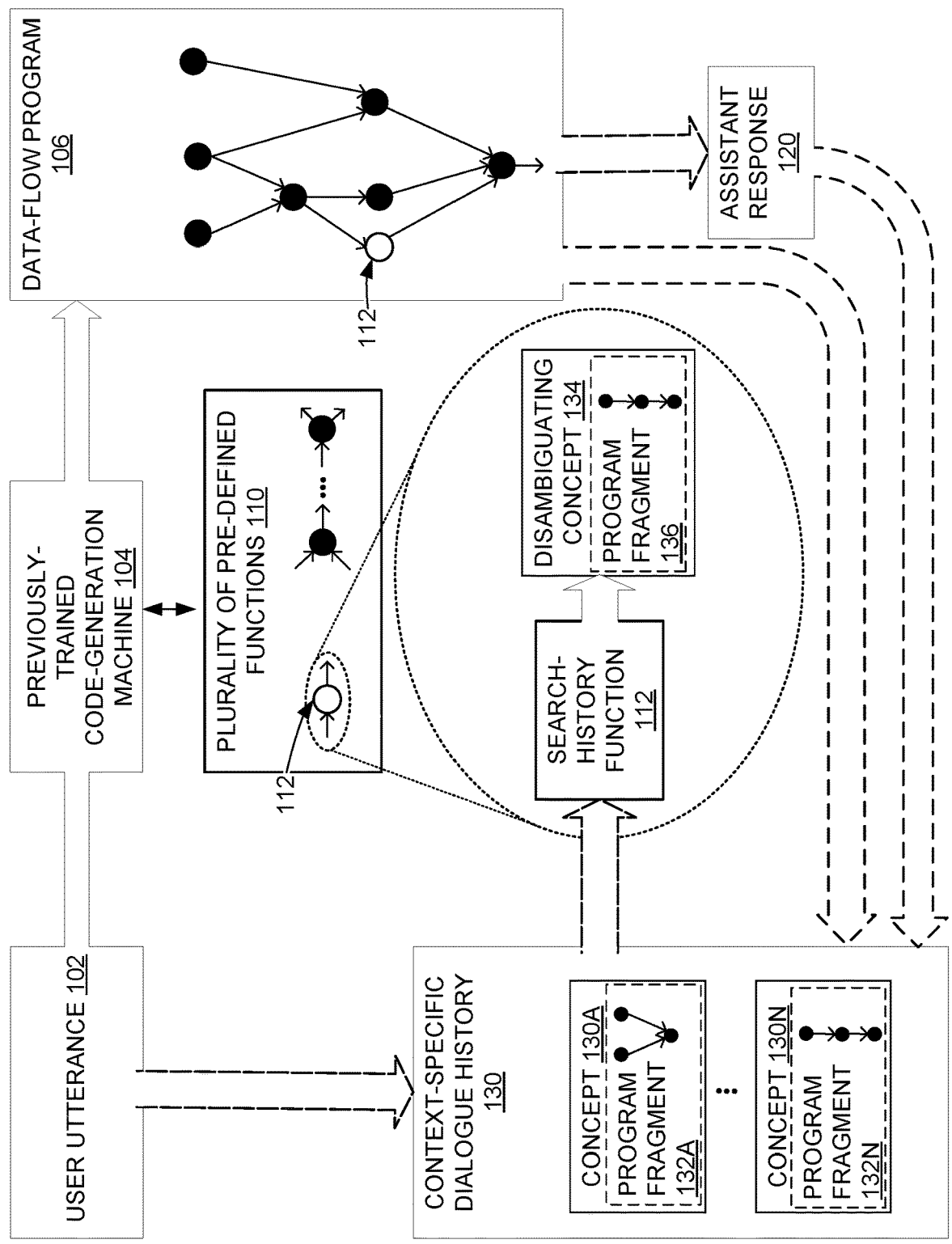

Accordingly, FIG. 1B shows a different view of automated assistant system 100 focusing on a search-history function 112 of the plurality of pre-defined functions 110. The search-history function 112 is configured to process an ambiguous user utterance 102 by resolving any ambiguities using concepts from context-specific dialogue history 130. As shown by the dashed arrow leading from context-specific dialogue history 130 to search-history function 112, search-history function 112 is configured to access one or more concepts from the context-specific dialogue history 130 to determine a disambiguating concept 134.

In some examples, disambiguating concept 134 is defined by a program fragment 136. As an example, if user utterance 102 refers to an ambiguous entity, e.g., by a pronoun or partial name, such as "Tom", search-history function 112 may be configured to search for the ambiguous entity, e.g., based on the partial name "Tom", in the context-specific dialogue history 130 to find a clarifying entity that matches the ambiguous entity, e.g., an entity having a first name "Tom" or a related name such as "Thomas". In some examples, the clarifying entity may be defined by a full name, e.g., "Thomas Jones". In other examples, the clarifying entity may be defined by code configured to find the clarifying entity, e.g., code to lookup people named "Tom" in an address book of the user.

In some examples, disambiguating concept 134 indicates a bridging anaphora between a user utterance and a previous user utterance from the context-specific dialogue history. As an example, if a user asks, "when is my lunch with Charles?" and then subsequently asks, "how long will it take to get there?" the word "there" in the subsequent user utterance refers to the location of the lunch with Charles. Accordingly, search-history function 112 may be configured to search for a concept corresponding to the location of the lunch with Charles. For example, the concept may include a data-flow program fragment that recursively uses the search-history function 112 to find a salient event, namely the meeting with Charles, as well as further instructions to obtain the location of the salient event. More generally, concepts found by the search-history function 112 may include data-flow programs that recursively invoke the search-history function 112 to find any suitable sub-concepts, e.g., so that a salient concept is defined in terms of searching for other salient sub-concepts.

Figure 1C:
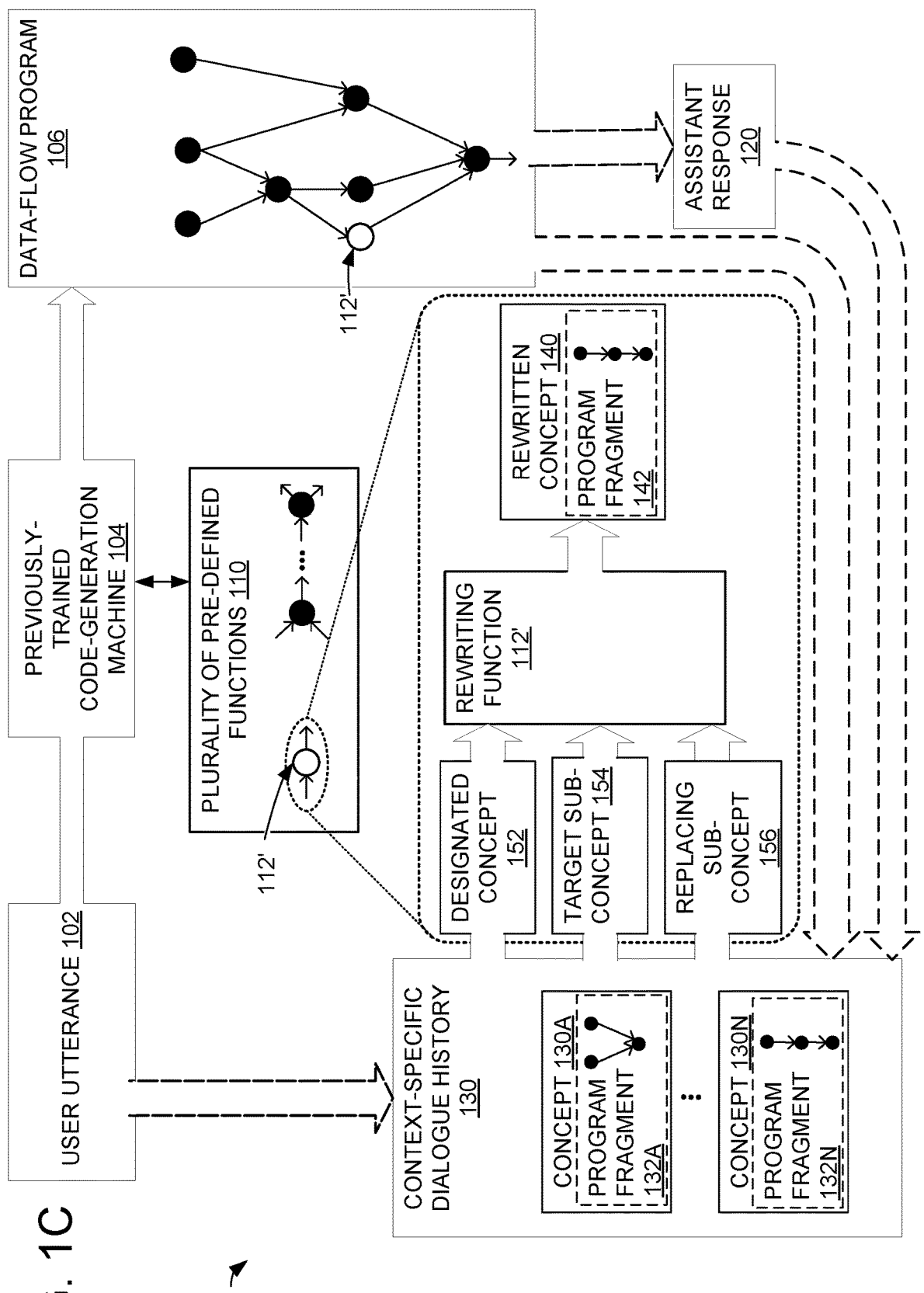

FIG. 1C shows another different view of automated assistant system 100 focusing on a program-rewriting function 112'. Program-rewriting function 112' is configured to produce a rewritten concept 140, e.g., defined by a rewritten program fragment 142, by starting with a designated concept 152 from the context-specific dialogue history 130, wherein the designated concept 152 includes at least one replacement target sub-concept 154 to be modified/replaced with a different, replacing sub-concept 156. As an example, designated concept 152 may refer to an action by the automated assistant including "placing a reservation at a local sushi restaurant". Accordingly, target sub-concept 154 may be the description "sushi restaurant," and the replacing sub-concept 156 may be an alternate description "burrito restaurant." In particular, designated concept 152 may be defined by a program fragment for invoking an API to place restaurant reservations, wherein the API is parametrized by a program fragment corresponding to target sub-concept 154 that indicates a restaurant at which to place reservations. Accordingly, program-rewriting function 112' is configured to output a re-written concept 140 that corresponds to "placing a reservation at the local burrito restaurant," so that re-written concept 140 may be used to perform a new action that includes placing the reservation at the local burrito restaurant, e.g., by executing program fragment 142.

Figure 1D:
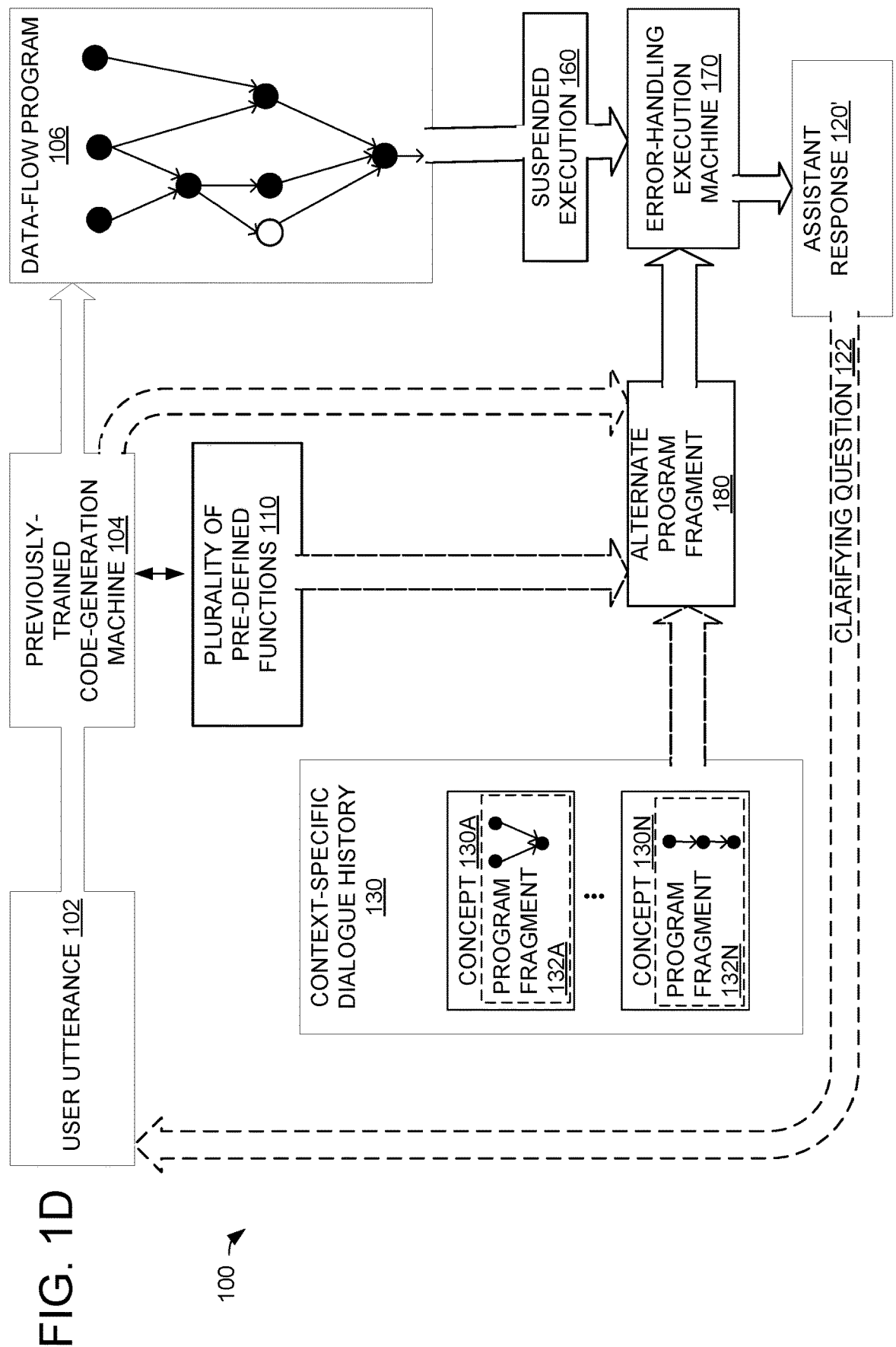

FIG. 1D shows another view of automated assistant system 100 focusing on handling errors that may arise during execution of data-flow program 106. Although not shown in FIG. 1D, as in FIGS. 1A-1C, the user utterance 102, data-flow program 106 and/or assistant response 120 may be stored into context-specific dialogue history 130 while processing user utterances.

If an error condition is reached during execution of data-flow program 106 prior to outputting an assistant response 120, then the data-flow program may be suspended and saved as suspended execution 160. Error-handling execution machine 170 is configured to recover from the error condition in order to produce the assistant response 120'. For example, error-handling execution machine 170 may implement method 400, which is described with regard to FIG. 4, below. To recover from the error condition, error-handling execution machine 170 may modify and/or re-execute the suspended execution 160. Alternately or additionally, error-handling execution machine 170 may execute an alternate program fragment 180. For example, error-handling execution machine 170 may modify the suspended execution 160 by using a program-rewriting function to replace a program fragment of the data-flow program 106 with the alternate program fragment 180, and/or by executing the alternate program fragment instead of the data-flow program 106. The alternate program fragment 180 may be derived from the context-specific dialogue history 130, e.g., the alternate program fragment 180 may be a previously-executed program fragment, built from the plurality of pre-defined functions 110 and/or output by the previously-trained code-generation machine 104. In some examples, previously-trained code-generation machine 104 is configured to recognize the error condition and to output a new program fragment configured to recover from the error. For example, previously-trained code-generation machine 104 may be trained with regard to one or more training examples, each training example including an example error condition, and an example data-flow program fragment for responding to the error. For example, previously-trained code-generation machine 104 may be trained with regard to a large plurality of annotated dialogue histories, where some or all of the annotated dialogue histories include an occurrence of an error condition.

In some examples, the error condition may arise due to an ambiguity in the user utterance 102 in which insufficient information is provided by the user utterance 102 to fully serve the user based on the user utterance. As an example, if the user utterance is "Schedule a meeting with Tom" but there is more than one "Tom" in the user's address book, it may not be clear with whom to schedule the meeting. Accordingly, in some examples, error-handling execution machine 170 is configured to execute code to produce an initial assistant response 120' including a clarifying question 122. The clarifying question 122 is output for the user to respond to in a new, clarifying user utterance 102. Accordingly, the clarifying user utterance can be processed using the previously-trained code-generation machine 104 to produce a new data-flow program 106 for responding to the clarifying user utterance. The previously-trained code-generation machine 104 may be trained via supervised training on a plurality of annotated dialogue histories. In many examples, the previously-trained code-generation machine 104 is trained on a large plurality of annotated dialogue histories, e.g., hundreds, thousands, tens of thousands or more. Annotated dialogue histories describe state information associated with a user interacting with an automated assistant, annotated with an example data-flow program for responding to the user interaction. For example, an annotated dialogue history may include a context-specific dialogue history according to the present disclosure, annotated with an example data-flow program suitable for execution by the automated assistant in response to the context established in the context-specific dialogue history. In examples, a context-specific dialogue history includes a plurality of events arranged in a temporal order, e.g., time-stamped events, including user utterances, data-flow programs executed by an automated assistant, responses output by the automated assistant, and/or error conditions reached while executing data-flow programs.

As a non-limiting example, an annotated dialogue history may include a context-specific dialogue history in which the most recent event is an example user utterance, annotated with an example data-flow program for responding to the example user utterance with regard to the context established by the context-specific dialogue history. Accordingly, the previously-trained code-generation machine 104 may be trained to reproduce the example data-flow program given the example user utterance and the context-specific dialogue history. The example data-flow program may include any suitable functions in any suitable sequence/arrangement, so that via training, the code-generation machine is configured to output suitable functions in a suitable sequence. For example, the example data-flow program may include the search-history function and accordingly, the code-generation machine may be trained to output the search-history function along with other functions in a suitable sequence for responding to a user utterance, e.g., to cause an automated assistant to perform any suitable response action, such as outputting a response as text and/or speech, or invoking an API. In some examples, an annotated dialogue history includes a context-specific dialogue history in which the most recent event is the occurrence of an error condition, e.g., instead of a user utterance being the most recent event, annotated with a data-flow program for recovering from the error. Accordingly, the previously-trained code-generation machine 104 may be trained with regard to such annotated dialogue histories to generate suitable data-flow programs for recovering from error conditions.

Annotated dialogue histories may be obtained in any suitable manner, for example, from human demonstrators. For example, one or more human demonstrators may be shown context-specific dialogue histories, e.g., context-specific dialogue histories derived from usage data obtained from interaction with humans, and/or machine-generated context-specific dialogue histories, and for each context-specific dialogue history, be asked to provide a suitable data-flow program for responding to the context-specific dialogue history. The data-flow programs provided by the human demonstrators may use the pre-defined functions in any suitable manner to perform a wide range of tasks responsive to user utterances and/or error conditions.

For example, based on being shown an example user utterance or an example error condition, the human demonstrators may provide example data-flow programs that perform any suitable calculations, output responses, e.g., to ask clarifying questions of the user, or answer a query issued by the user, listen for utterances from a user, e.g., to obtain clarifications from the user, invoke APIs, etc. Furthermore, the example data-flow programs may include the search-history function, e.g., "getSalient( )", and/or program-rewriting function, e.g., "Clobber( )", invoked with any suitable parameters, for example, to execute data-flow program fragments from the context-specific dialogue history. Accordingly, by training on a plurality of annotated dialogue histories, the code-generation machine 104 may be trained to generate data-flow programs similar to those provided by the human demonstrators, in order to respond to user utterances and/or recover from errors.

The data-flow programs, e.g., data-flow programs generated by the previously-trained code generation machine and/or example data-flow programs, are built from a plurality of pre-defined, composable functions. The pre-defined, composable functions may be composed into programs that invoke the pre-defined, composable functions in in any suitable order and parametrize the pre-defined, composable functions in any suitable fashion. Accordingly, the previously-trained code-generation machine may be trained to output suitable data-flow programs for a user utterance, based on the example data-flow programs provided during training. The previously-trained code-generation machine is not limited to hard-coded behaviors. For example, instead of or in addition to responding to example user utterances seen during training, the previously-trained code-generation machine is configured to process novel user utterances (that may not have been provided during training) by generating corresponding, novel data-flow programs (that also may not have been provided during training).

In order to generalize from specific training examples seen during training and respond to novel user utterances with novel data-flow programs, the previously-trained code-generation machine may be trained in any suitable fashion, e.g., using any suitable ML, AI, and/or NLP models as will be described below with regard to FIG. 6, on any suitable training data, for example, a large plurality of annotated dialogue histories. In some examples, the previously-trained code-generation machine may be trained with regard to a loss function for assessing whether a data-flow program is a suitable response to a user utterance, wherein the loss function is configured to indicate zero loss or a relatively small loss, e.g., requiring no adjustment, or a relatively smaller adjustment of training parameters, when the code-generation machine successfully reproduces a training example, e.g., by producing the same data-flow program as was provided by a human annotator, given a context-specific dialogue history). However, although the loss function may be configured for a relatively small loss when the code-generation machine successfully reproduces a training example, the loss function may also be configured for a relatively small loss when the code-generation machine reproduces a different data-flow program, for example, a data-flow program that has a similar effect when executed, and/or a data-flow program that is indicated to be satisfactory by a human user, e.g., a human demonstrator and/or end-user of an automated assistant device. These example approaches for generalization during training are non-limiting, and any suitable AI, ML, and/or NLP techniques may be utilized to suitably train a code-generation machine to generate suitable data-flow programs in response to a wide variety of user utterances.

In some examples, error conditions are recognized by operating a previously-trained error detection model. For example, the previously-trained error detection model may be trained via supervised training on a plurality of annotated dialogue histories, wherein the annotated dialogue histories are annotated to indicate when errors occur. For example, the annotated dialogue histories may be obtained by showing context-specific dialogue histories to one or more human demonstrators and asking the human demonstrators to indicate when the context-specific dialogue histories indicate an erroneous state.

In addition to history-accessing functions such as a search-history function and a program-rewriting function, the plurality of pre-defined composable functions may include any suitable functions, for example, a listen function configured to listen for a specific user utterance before continuing with execution of a data-flow program and/or while speculatively executing selected nodes of a data-flow program, a response function configured to output a description of a value determined during execution of a data-flow program, and/or a primitive calculation function for processing values obtained from user utterances and/or computed during execution of the data-flow program, e.g., data structure operations such as forming tuples from data, or arithmetic operations.

In some examples, the plurality of pre-defined composable functions includes a foreign function configured to invoke a foreign (i.e., third party) API. For example, foreign APIs may be invoked to interact with real-world services, e.g., schedule a car in a ride-hailing service, order food or make reservation at a restaurant. In some examples, the plurality of pre-defined composable functions includes an inference function configured to perform a calculation with regard to a result of a foreign function. The inference function may encapsulate high-level behaviors with regard to the API, which would otherwise require multiple different low-level functions using the API. For example, a foreign ride-hailing API may support functions for scheduling a car, adding a stop to a route, and finalizing a scheduled route. Accordingly, an inference function may be configured to receive a destination and, based on the destination, schedule a car, add a stop corresponding to a pickup location for the user, add a stop corresponding to the destination, and finalize the scheduled route including the stops corresponding to the pickup location and destination. By using inference functions to encapsulate high-level behaviors, the code-generation machine may be able to readily output well-typed code for performing the high-level behaviors using a foreign API, without needing to output individual steps using low-level functions of the foreign API. In some examples, an inference function may be defined with regard to one or more constraints and executing the inference function may include running a constraint satisfaction program to satisfy the one or more constraints, before invoking a foreign API using parameters defined by the solution for the constraints. In some examples, the one or more constraints may include "fuzzy" or "soft" constraints and accordingly, solving the constraints may include executing an inference program suitable for "fuzzy" logical inference, for example a Markov logic inference program.

In some examples, the plurality of pre-defined composable functions includes a user-customized function that is configured to access a user customization setting and to perform a calculation based on the user customization setting. For example, the user-customized function may be configured to determine whether the user is free based on a user-customized schedule, e.g., calendar data. User-customized functions may be implemented using foreign functions configured to invoke a foreign API, e.g., an API for looking up calendar data.

In some examples, the plurality of pre-defined composable functions includes an intelligent decision function, wherein the intelligent decision function is configured to use a previously-trained machine learning model to perform a calculation. As an example, the search-history function may be an intelligent decision function configured to use a previously-trained relevance detection machine to search the context-specific dialogue history. As another example, the plurality of pre-defined composable functions may include an intelligent decision function configured to assess whether it is "morning" in a user-specific and/or population-specific way, e.g., the function may be configured to recognize that what time the user considers "morning" could vary depending on the day of the week or time of the year. For example, the intelligent decision function may be configured to assess that it is "morning" if it is between 6 AM and 11 AM on a weekday, but may be configured to assess that it is morning if it is between 9 AM and 12 PM on a weekend. The intelligent decision function may be trained in any suitable fashion, for example based on labeled examples of times and whether or not a user considers the time morning. As with user-customized functions, the intelligent decision function may take into account auxiliary information such as a work schedule, calendar, and/or mobile phone usage of a user, for example to determine if it is "morning" based on whether the user has likely woken up yet on a given day. In some examples, an intelligent decision function may be configured to assess an ambiguity, e.g., an ambiguous user utterance, or an ambiguous constraint, and select a disambiguating data-flow program to respond to the ambiguity.

In some examples, the plurality of pre-defined composable functions includes a macro function, wherein the macro function includes a plurality of other pre-defined composable functions, and is configured to execute the plurality of other pre-defined composable functions. For example, a macro function can be used to sequence and organize related low-level steps of a high-level task using low-level functions. By using macro functions to encapsulate high-level behaviors, the code-generation machine may be able to readily output well-typed code for performing the high-level behaviors without needing to output individual steps using low-level functions.

Turning briefly to FIG. 1E, FIG. 1E shows a first example of a dialogue between a user and an automated assistant, in which the automated assistant processes a user utterance 102' in which there is no ambiguity. Context-specific dialogue history 130 is shown including concepts 130A, 130B, and further concepts through 130N. However, in this example, the user utterance 102' is unambiguous and may be processed without referring to the context-specific dialogue history 130. The user asks, "When is my next meeting with Tom Jones?" and the previously-trained code-generation machine outputs a data-flow program 106'.

Data-flow program 106' is shown with a non-limiting example syntax in which square brackets indicate return values of expressions, e.g., [events] indicates a return value of an expression for finding all events matching a set of criteria, and [time] indicates a start time of the first such event in the set. The example syntax includes various functions including the search-history function, e.g., "getSalient( )", and program-rewriting function, e.g., "Clobber( )", as well as other functions such as primitive functions, API functions, etc., as described herein. The example functions are shown in a function-call syntax indicating the name of a function, e.g., "Find", "getSalient", "Clobber", among other named functions, and parentheses enclosing parameters for invoking the function. The example function-call syntax is non-limiting, and functions may be invoked and parametrized in any suitable manner, e.g., using any suitable formal-language syntax. The example function names represent pre-defined functions with implementations that are not shown herein. For example, each pre-defined function may be implemented by any suitable sequence of one or more instructions executable by the automated assistant to perform any suitable steps, e.g., to result in behavior indicated by the function name, behavior set forth in this disclosure, and/or any other suitable behavior such as performing calculations, invoking APIs, outputting audio, visually presenting information via a display. For example, the "Find" function may be implemented in any suitable manner, for example, by invoking an API to look up information stored in a user calendar.

As shown, the data-flow program finds events that have an attendee named "Tom Jones." The data-flow program computes values such as [events] and [time] and then outputs a response 120' using a "describe" function configured to output a description of the value [time], e.g., as speech via a speaker of an automated assistant device. Accordingly, response 120' indicates the meeting time for the next meeting with Tom Jones, namely "at 12:30".

Standard conversational semantic parsing maps a complete user utterance into an executable program, e.g., a data-flow program, executes the program to query information sources or effect external actions, then, after execution, responds to the user. This process can be slow and will lag behind the user utterance when the program contains expensive function calls, particularly if the function calls are nested and cannot be parallelized.

As an alternative, latency may be reduced by predicting and speculatively executing function calls while the user is still speaking based on partial results from automatic speech recognition (ASR) and the current state of execution. Identifying and pre-executing partial programs while the user is still speaking provides the technical benefit of expediting the final response to the user, thus improving user satisfaction due to improved computer-human interaction.

Effectively, this constitutes an online decision problem, wherein decisions to invoke particular functions on particular arguments may be made before all information has arrived. This is referred to herein as "online semantic parsing". Such predictive decisions may include spotting user intents that have already been expressed (in some cases, without the help of aligned training data) and anticipating user intents from context that have not been expressed yet.

A generalized framework is provided herein, comprising a two-stage approach. First, a learned prefix-to-program prediction module is invoked. One example employs a neural graph-based semantic parser, which is specially trained to parse an incomplete utterance into a full program. Additionally or alternatively, a pipeline that uses a language model (LM) may be employed to predict how a user will finish the incomplete utterance. The predicted completed utterance may then be parsed. For either approach, subprograms may be selected for execution as soon as the semantic parser predicts that the subprogram has a high probability of being in the correct parse. For example, a thresholding heuristic may be applied for selecting subprograms for early execution.

Figure 2:
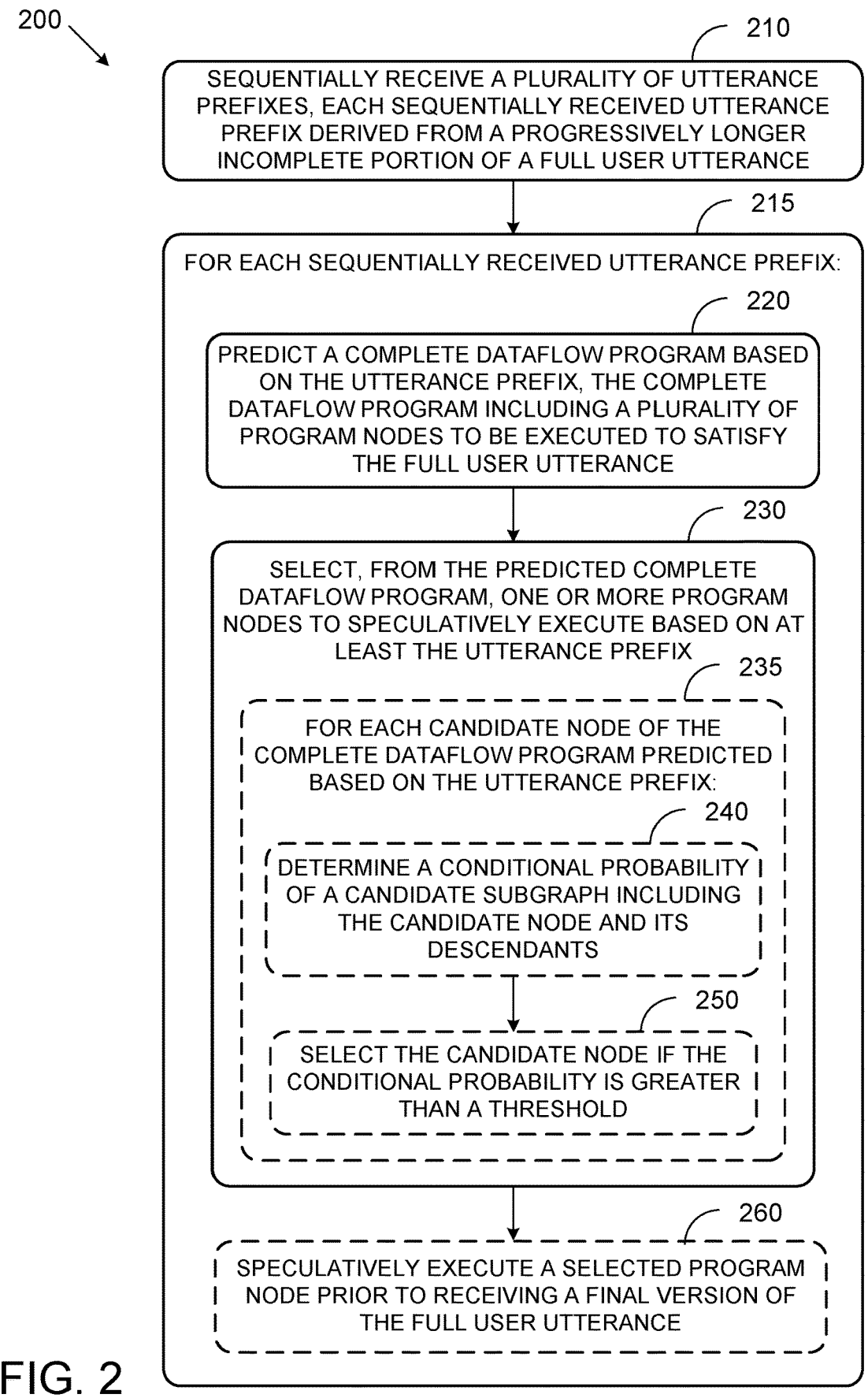
FIG. 2 is a flow diagram illustrating an example method for speculatively executing nodes of a data-flow program.

FIG. 2 shows a flow-diagram for an example computer-implemented method 200. In some examples, method 200 is executed by a computing system configured to receive speech input, the output of automatic speech recognition algorithms, text input, etc. such as a digital assistant, kiosk, smart phone, tablet device, computer, driving assistant, etc. Method 200 describes example approaches for reducing latency that, in some examples, include predicting and executing function calls while the user is still speaking.

This example is primarily described with reference to data-flow graphs, though the method is applicable to other notations, programming languages and styles. In a data-flow graph, a program is represented as a labeled directed acyclic graph G=(V, E), where each node v∈ V represents a function invocation or a constant value, and each directed edge $$u \xrightarrow{\ell} v$$

∈ E represents that v fills the $\ell$ argument of the function u. Positional arguments are given edge labels such as arg0, arg1, etc. The terms "graph" and "program" are used interchangeably herein.

At 210, method 200 includes sequentially receiving a plurality of utterance prefixes, each sequentially received utterance prefix derived from a progressively longer incomplete portion of a full user utterance. In some examples, each of the plurality of utterance prefixes are received from a speech to text module that employs automatic speech recognition algorithms. In some examples, the plurality of utterance prefixes are accompanied by contextual information such as the identity of the speaker, the location of the speaker, any prompts presented prior to receiving speech etc.

Continuing at 215, actions are described that apply to each sequentially received utterance prefix. For example, an offline system that models p(G|c, u) (where p is a distribution, G is an executable dataflow program, c is a context of a dialog history, and u is a user utterance) may only predict the program after the user utterance u has been fully received. In contrast, method 200 allows the system to simultaneously parse each partial utterance as the user utters it, so as to pre-execute subprograms and thus reduce the final response time. In contrast to simultaneous machine translation (MT) approaches, in some examples, the user is not presented any output until their utterance is complete. As such, speculatively executing a predicted subprogram in the background does not commit the system to using the predicted subprogram in the final result. Any parse of $u_{[m-1]}$ therefore does not constrain a parse of $u_{[m]}$. Rather, in some examples, each prefix is re-parsed from scratch after each partial utterance is received.

At 220, method 200 includes predicting a complete dataflow program based on the utterance prefix, the complete dataflow program including a plurality of program nodes to be executed to satisfy the full user utterance.

For task-oriented dialogue systems, an executable complete dataflow program G is predicted in response to a user utterance prefix $u_{[m]}$ and in some examples is predicted further based on context c of a dialogue history. As an example, the utterance prefix is part of a token sequence $u=(u_1, u_2, \ldots, u_{|u|})$ and the context is encoded as a sequence $c=(c_1, c_2, \ldots, c_{|c|})$.

As an example, the value $u_{[m]}$ is used to denote the $m^{th}$ prefix presented to an online system, and $t_m$ is used to denote the time at which it is presented. Additionally or alternatively, t denotes the time at which the complete utterance u is presented. In some examples, different time points are recorded, e.g., one or more times at which a function invocation is selected by the system for execution, the time it is actually executed, and the time it returns.

A selected function invocation is generally not considered to be executed until its arguments have returned from execution. However, by that point, the system may have deselected the function, and thus will not execute it, as the system's predictions may have changed based on additional input.

In some examples, a system uses the noisy partial outputs returned by an ASR system from successively longer speech prefixes. In some examples, each partial ASR output $u_{[m]}$ is returned at some time $t_m \in \mathbb{R}$. In some such examples, the system appends one or more words to the previous output $u_{[m-1]}$, and/or revises some words.

In some examples, after each successive utterance prefix $u_{[m]}$, the complete graph G is predicted based on the current prefix $u_{[m]}$ and context c. As one example, the single most probable G is predicted. Additionally or alternatively, an estimate of the distribution $p(G|c, u_{|m|})$ is constructed. By predicting complete programs, more accurate fragments are likely to be yielded, by making the latent structure explicit. In some examples, the complete dataflow program is predicted by a machine learning model previously trained with training data including pairs of training utterance prefixes and training complete dataflow programs.

Generally, any graph G is able to be encoded as a sequence $a=(v_1, e_1, v_2, e_2, \ldots, v_{|V|}, e_{|E|})$. Each element of a graph can be regarded as an action that adds a node or a sequence of edges to the graph. In some examples, subgraphs correspond to contiguous substrings of a, but this is not always the case.

Each $v_k$ corresponds to a node, representing a constant value or function invocation, while each $e_k$ is a subsequence that lists all edges between $v_k$ and earlier nodes. In some examples, at training time, graphs are converted to action sequences that enable training a sequence-to-sequence model. At inference time, the model may output the action sequence, from which the graph can be constructed. Each node and each edge in G corresponds to one token in a, excepting for string literals, which can span multiple action tokens. A token of a string literal may appear directly as an action or can be copied from the $j^{th}$ token of the source.

In some examples, the machine learning model is previously trained to at least locally maximize $\Pi_{n=1}^{|a|} p(a_n|c, u_{[m]}, a_{1:n-1})$, where: a is a sequence of actions, each of which contributes to adding a node and/or a sequence of edges to the complete dataflow program; c is a context of a dialogue history; and $u_{[m]}$ is the utterance prefix.

In some examples, the model $p(G|c, u_{|m|})$ is trained to map each prefix of u to the complete graph. In some such examples, every ((c, u); G) pair in the original training data is multiplied into many training pairs ((c, $u_{|m|}$), G). In some such examples, the full graph is used as the target, rather than attempting to predict only the part of the graph that aligns to the prefix. In this way, the method does not require any alignment.

Such a model may attempt to predict any function calls that are likely based on the current prefix, even if they have not been explicitly mentioned yet. In some cases, the target graph is unreachable, such as when the target graph contains string literals that have not been seen yet, e.g., a copy function for a prefix in a position beyond the current prefix. To address this, the target action sequence may be modified to instead copy the final position of the prefix, e.g., using a MASK token as a placeholder for all future tokens. In this way, hallucination of free text by the model is reduced or disabled, while keeping the graph structure intact with the MASK token-based placeholder. As used herein, hallucination generally refers to the generation of one or more predicted utterances by a language model based on previously received utterances, utterance prefixes, and/or applicable context. In some examples, the hallucinated utterances are generated with incomplete intent, and thus include utterances that are not ultimately verifiable or supported by the complete dataflow program.

As such, in some examples, the complete dataflow program is predicted by hallucinating a predicted full utterance from the utterance prefix with a previously-trained language model. As a non-limiting example, the predicted full utterance is hallucinated from the utterance prefix by a Transformer-based language model.

In some examples, the machine learning model is previously trained to at least locally maximize $\Pi_{n=1}^{|a|} p(a_n|c, u, a_{1:n-1})$, where: a is a sequence of actions, each of which contributes to adding a node and/or a sequence of edges to the complete dataflow program; c is a context of a dialogue history; and u is the predicted full utterance.

In other words, the full utterance may first be predicted from the prefix. In some examples, a pretrained bidirectional and auto-regressive transformers (BART) model is fine-tuned so that it can map an utterance prefix, e.g., terminated with the MASK symbol to a full utterance, e.g., freely hallucinating content words. In some embodiments, the training data includes one example for each prefix of each utterance, so the fine-tuning objective is to maximize the sum of log p (u|c, $u_{|m|}$) over all prefixes $u_{|m|}$ of all utterances u.

Returning to FIG. 2, at 230, method 200 includes selecting, from the predicted complete dataflow program, one or more program nodes to speculatively execute based on at least the utterance prefix. In some examples, once the data-flow program has been predicted, nodes are selected based on the probability that they will eventually be executed, e.g., using a heuristic approximation to their marginal probability. As described further herein and with regard to FIGS. 4 and 5, selecting a node is additionally or alternatively based on a predicted execution cost and a predicted effect on overall latency. Additionally or alternatively, the proposal and selection steps may be combined into a single step that directly predicts some graph fragments to execute.

For example, at 235, steps are presented for selecting program nodes for each candidate node of the complete dataflow program predicted based on the utterance prefix. For a given graph $\hat{G}_m$ proposed from $u_{|m|}$, it is beneficial to speculatively execute subgraphs that are likely to be executed. In some examples, selection includes determining which program nodes, e.g., function invocations, are worth executing at this time, given what is known about received utterance prefixes, context, etc. The selection process may iterate for each received utterance prefix. In some such examples, the subset of program nodes that are selected function as an update that replaces the previous list of selected nodes. Any formerly selected nodes that were not executed, e.g., still waiting for their arguments, are not executed until they are selected again.

In some embodiments, at 240, method 200 includes determining a conditional probability of a candidate subgraph including the candidate node and its descendants. For example, calculating the conditional probability of the candidate subgraph includes multiplying predicted probabilities of all relevant actions responsible for building the candidate subgraph. In some examples, the conditional probability of a subgraph is obtained by marginalizing over all possible action sequences, as well as all completions u where applicable. This probability may be approximated by sampling from the models. For simplicity and efficiency, the probability of a subgraph of $\hat{G}_m$ is optionally approximated by the product of the conditional probabilities of the predicted actions that actually built that subgraph—that is, in some examples, each subgraph of the predicted $\hat{G}_m$ is built by a subset of the predicted actions a. This approximates the marginal probability of the relevant action subsequence by its conditional probability given preceding actions. Nodes $v \in \hat{G}_m$ are then selected such that the subgraph rooted at v has probability above a constant threshold.

In some examples, when the entire dataflow program is predicted, the conditional probability is based on at least the predicted unseen tokens of u and/or the seen tokens of u. Because all of the tokens potentially contribute to such a subgraph, there is no alignment. As such, when $p(u|c, u_{|m|})$ is small (e.g., below a threshold), all subgraphs are regarded as uncertain.

At 250, method 200 includes selecting the candidate node if the conditional probability is greater than a threshold. Certain exceptions to this process may apply. For example, a node whose subgraph has previously executed, e.g. after predicting and selecting it from a previous prefix, would not be selected again. This would be redundant, as either the results of execution are known or pending. Nodes whose function invocations have side effects are generally not selected until the utterance is complete, as these nodes may be unsafe to pre-execute. Once the utterance is complete, all unexecuted nodes of the final predicted graph, $\hat{G}$, may be selected, as they are both safe and necessary to execute.

In some embodiments, at 260, method 200 includes speculatively executing a selected program node prior to receiving a final version of the full user utterance. In some examples, the selected program node is executed after arguments of children of the selected program node have returned from execution, provided the selected program node remains selected based on subsequently received utterance prefixes, subsequently predicted complete dataflow programs, and/or subsequently understood context.

By implementing a strong graph-based semantic parser, either trained to parse prefixes directly or combined with a pre-trained language model for utterance completion, followed by a heuristic for subgraph selection, it is possible to reduce latency significantly. As such, the technical effects of implementing such a method include improved human-computer interactions. Different types of parsers and executable semantic representations may be implemented with the general framework of method 200.

Figure 3:
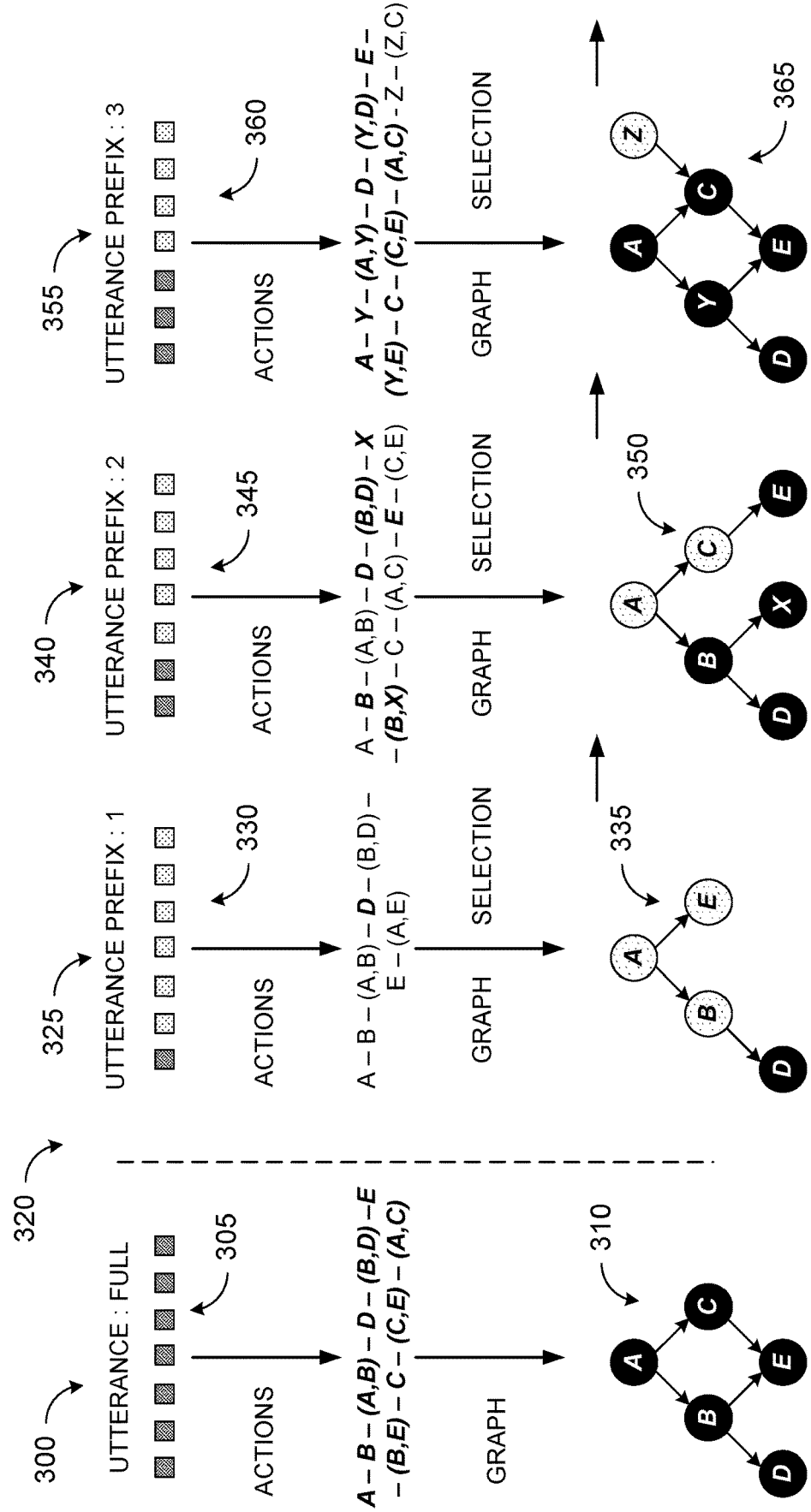
FIG. 3 schematically depicts the execution of nodes of a data-flow program based on received utterance prefixes.

As a visual example, FIG. 3 schematically depicts the execution of nodes of a data-flow program based on received utterance prefixes. An example framework is shown for simultaneous semantic parsing. Graph nodes and edges are represented as actions in the target (following a depth-first traversal order).

At 300, a full, utterance 305 is received in an offline parsing scenario. A full graph 310 is predicted including a series of actions. Nodes (circles) and edges (connecting arrows) can be executed, presuming they are not dependent on any child actions returning values.

At 320, a partial online parsing scenario is depicted. At each prefix position, the model first proposes a full graph which is then pruned based on predicted probabilities. The surviving (selected) nodes, in black, (also listed in bold-italics) can be executed once their children have returned. As new utterance prefixes are received, the graph is amended. As speculatively executed nodes return values, upstream nodes that depend on those nodes can be executed.

At 325, a first utterance prefix 330 is received. As described with regard to FIG. 2, the system may predict programs responsive to the receipt of each partial utterance and/or utterance prefix from the ASR. Graph 335 is predicted, and node D is selected for speculative execution.

At 340, a second utterance prefix 345 is received. This causes graph 335 to be updated to graph 350. In graph 350, an additional node X connected to node B is added, and an additional node C is added between nodes A and E. As node D has returned a value, nodes B and X can be speculatively executed, as can node E.

At 355, a third utterance prefix 360 is added. This causes graph 350 to be updated to graph 365. In graph 365, an additional node Z connected to node C is added, a new node Y is added to replace node B, and node E has been moved to depend from nodes Y and C, replacing node X. As nodes D and E have returned values, nodes C, Y, and A can be speculatively executed.

In some examples, the subgraph selection decisions are made by a learned model that considers the cost and benefit of each call, rather than using a fixed threshold. The semantic parser could also condition on the execution status, instead of operating separately from the learned model. All subgraphs with the same probability have the same risk of being useless work, but they do not all represent the same amount of useless work. Some incorrect subgraphs will require more computation than others. Similarly, subgraphs with the same probability share the same likelihood of being useful work, but they are not all equally useful in reducing latency. Some correct subgraphs can be postponed for longer without affecting the overall latency, because they will run more quickly or will not be needed as soon. As such, it may be appropriate to raise the threshold for invoking a subgraph and wait for more evidence that the subgraph is actually correct.

Figure 4:
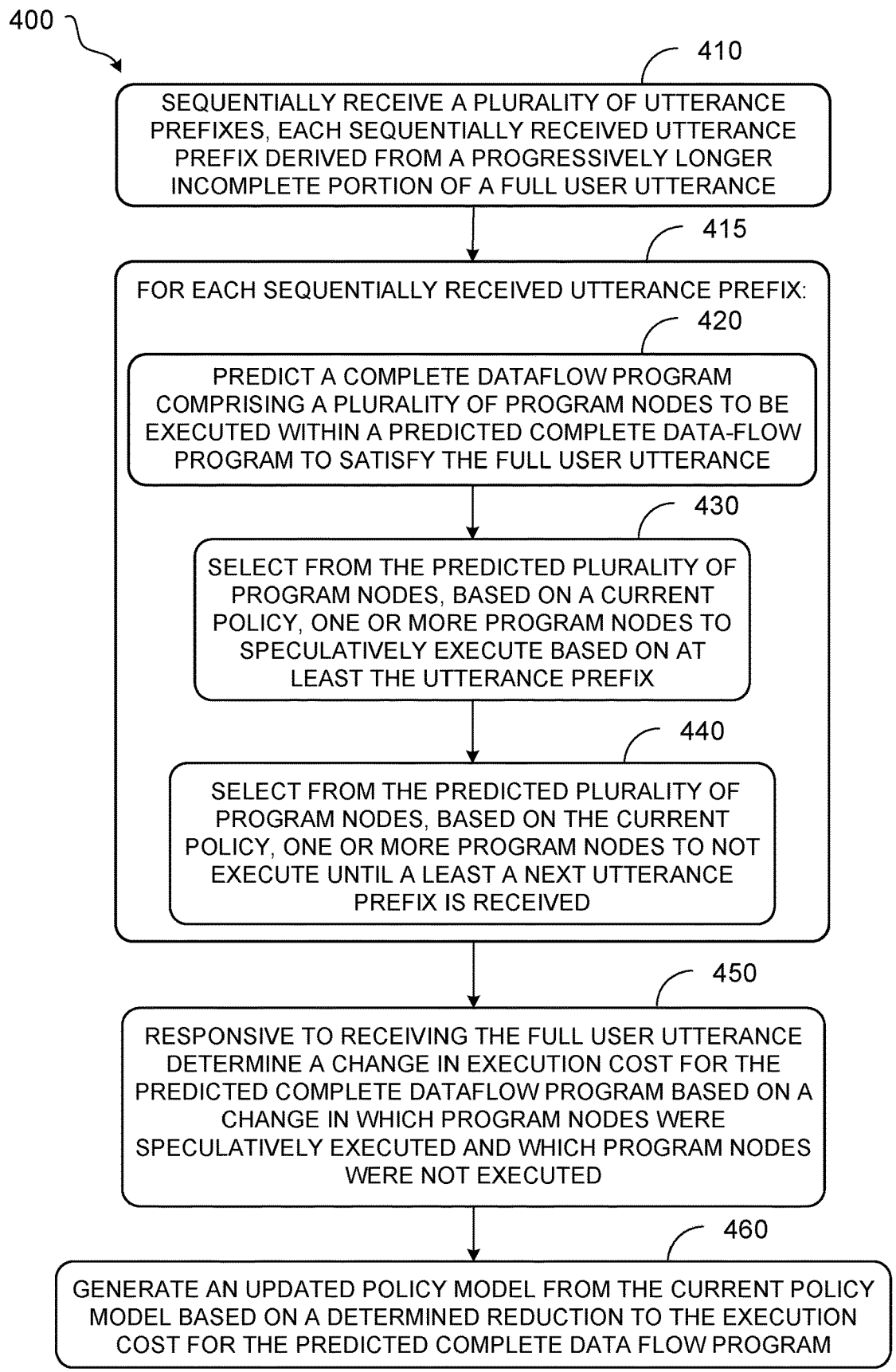
FIG. 4 is a flow diagram illustrating an example method for training a data-flow program based on execution costs.

Method 200 describes a probability-based policy for deciding whether to execute a predicted function call based on whether its estimated probability is above a constant threshold. However, even with an accurate probability estimator, this policy may not always be effective, as it does not consider the cost of executing a possibly incorrect call or the benefit of executing a call before more information is available. In FIG. 4, a flow diagram illustrates an example method 400 for training a data-flow program based on execution costs. In some examples, method 400 is executed by a computing system employing numerous models and subsystems, such as an API for calling function invocations, an ASR for translating speech to utterance prefixes, a model for predicting full data-flow graphs based on the utterance prefixes, a translator, such as seq2seq for predicting future utterance prefixes, and a policy trainer.

Method 400 is presented for training a system that may begin with a probability-based policy, but is iteratively improved using a policy trainer, such as the locally optimal learning to search (LOLS) algorithm. For each utterance on which the system runs, it can be measured how much changing each one of the system's decisions would have helped or hurt, assuming the preceding and subsequent decisions were still made by the current policy. Such counterfactual measurements may be obtained rapidly and do not require supervised data. The policy trainer may then use them to improve the parameters of the policy. The LOLS algorithm, as a non-limiting example, is initialized using a non-optimal reference policy, iteratively improving the policy through sequential rounds of policy execution in a search space, selecting the action leading to the minimal expected loss for each state.

At 410, method 400 includes sequentially receiving a plurality of utterance prefixes, each sequentially received utterance prefix derived from a progressively longer incomplete portion of a full user utterance.

For example, the output of the ASR, e.g., utterance prefix, may be received. However, in some examples, the original speech and/or audio file itself is received. It should be noted that the utterance prefix evolves by appending new prefixes and/or by revising older words and prefixes as more context becomes available. As such, a previously received utterance prefix may be adjusted based on new information.

At 415, actions are described that apply to each sequentially received utterance prefix. in some examples, the system predicts programs responsive to the receipt of each partial utterance and/or utterance prefix from the ASR.

At 420, method 400 includes predicting a complete dataflow program comprising a plurality of program nodes to be executed to satisfy the full user utterance. In some examples, the utterance prefix is mapped to possible full utterances using a sequence to sequence model, then a semantic parser used to map each possible full utterance to one or more possible plans. In some examples, the utterance prefix is mapped directly to possible plans. In some cases, this mapping is be performed with a lightweight version of the semantic parser. In some examples, the prefixes are mapped directly to complete plans without using the complete (predicted) utterance as an intermediate step. The target is then the complete plan that would be predicted from the complete utterance. Training may be performed on unannotated user data, actual ASR prefixes, and/or the predicted plan. Once trained, the policy may be used to evaluate the function invocations in the k-best model-predicted plans and decide which plans have execution cost benefits. In yet another example, the policy is used to map the utterance prefix directly to a set of function invocations that are worth speculatively executing.

At 430, method 400 includes, selecting from the predicted complete dataflow program, based on a current policy, one or more program nodes to speculatively execute based on at least the utterance prefix. Continuing at 440, method 400 includes, selecting from the predicted complete dataflow program, based on the current policy, one or more program nodes to not select for execution until at least a next utterance prefix is received. As an non-limiting example, nodes are given a "select" status or a "non-selected" status, indicating that node has been selected for speculative execution or non-selected for speculative execution at least until additional information is received.

In some examples, the same architecture is used for prediction and modeling as for choosing the API calls. For consistency, the architecture may use the same model that makes the pre-fetched calls and the residual calls when an utterance is completed.

In some examples, the current policy selects program nodes to speculatively execute based on an execution cost. Each action associated with a node has an execution cost including the passage of time. For example, it may be preferential to terminate the dataflow program sooner rather than later. The execution cost of a latency may be nonlinear in its length. The execution cost may be based on an execution time per action, a total number of actions, a latency on terminating the dataflow program, a number and/or complexity of processing operations performed while completing each action, etc.

The policy may determine an execution cost for speculatively selecting and executing a candidate node and invoking an associated function call. In some examples, the execution cost is based on a probability that the invocation will appear in the final dataflow program, and/or an expected latency of that invocation. As new information is received (new utterance prefixes, adjusted utterance prefixes, associate context), the probability that the invocation will appear in the final data flow program evolves, either increasing or decreasing. As such, in some examples the execution cost is also based on a distribution as to how the prefix will evolve. This may occur when a prefix has changed, and/or when invocations have returned. During an interval when the distribution remains constant, taking additional action is unlikely to be informative. Further, as a practical limitation, a function (f(y)) cannot be invoked until y has been computed, e.g., y=g(x), result of a previous function invocation such as getSalient( ).

At 450, method 400 includes, responsive to receiving the full user utterance, determining a change in execution cost for the predicted complete dataflow program based on a change in which program nodes were speculatively executed and which program nodes were not executed.

Once the utterance is complete, a final plan may be predicted, and any or all of the function invocations in that plan that have already been called but not invoked may be run. In some examples, the plan execution waits for all results to return before terminating. In some examples, the policy trainer speeds up the execution of the final predicted program by making certain API calls early. Thus, in some examples, the cost of an action sequence is evaluated on the predicted program, not the true program, even if known. In some embodiments, the policy trainer is continually updated based on live unannotated user data. In some examples, a one-step change for the policy trainer includes changing a node that is ready to run from selected status to non-selected status, or vice-versa.

In some examples, determining a change in the execution cost includes considering the current environmental states. Example environmental states include: a current utterance prefix as reported by the ASR system, a delay since the prefix last changed, e.g., increasing until the prefix changes again or the ASR system declares the utterance as having terminated; actions taken so far (needed to determine the reward in the final state); and the return values from those actions. The current utterance prefix and the delay since the prefix last changed evolve stochastically, independent of any actions taken. Actions taken so far have deterministic transitions, where actions are added to the state as they are taken. The return values evolve stochastically, with stochastic return values arriving after a stochastic latency.

In some examples, the API can handle multiple requests in parallel, so that the distribution of (return value, latency) does not depend on when the function is invoked, or what other functions are invoked. For any received utterance, the stochastic evolution is known, and the latencies for function invocations in the actual final plan are known. In a simplified system, the API calls have no side effects that are visible to the user, such as interruptions, highlighting display entities, re-prompting, etc. As such, function invocations have return values, but no side effects. Accordingly, the effects on latency, accuracy, and computing cost can be determined without considering such side effects. These effects will not change if the actions are changed, as invoking a function earlier will not change its latency or the utterance. The recorded action sequence will change along with the action sequence itself, but in a known deterministic way.

To estimate marginal probabilities of function calls from an ASR prefix, the seq2seq or other suitable model may be used to sample a number of possible completions of the prefix. In some examples, these possible completions are run in parallel, with the resulting plans yielding an estimate of the distribution across plans. In some instances, when the utterance is complete, this collapses to an exact point distribution that puts a probability of 1 on the true final plan. In such examples, marginal probabilities of different function invocations are then computed given the prefix. In some examples, calls intelligently hallucinate entities that are not in the prefix but have been predicted by the seq2seq or other suitable model.

In practice, there are plural sources for function arguments—e.g., references to the return values of previous calls, copied spans, detected entities, and constants. Constants are generally used for arguments that cannot be obtained in any other way, but constants are not allowed for all types. In some examples, predicting a complete plan based on only the prefix would require enlarging the set of constants to include copied spans and detected entities that have not yet been seen, and allowing all types to have constants.

Additionally or alternatively, the target plan in the training data is abstracted into a partial plan, for prediction. In some examples, the complete plan is then modeled as a sequence of function invocations in a canonical order. To prepare training data, an invocation can be deterministically deleted if it depends on an argument that is unpredictable from the prefix, or depends on such an invocation. Such invocations may be considered "inaccessible" from this prefix, and deleting these inaccessible prefixes will delete many of the function invocations that do not correspond to any words in the prefix.

Even if a function invocation is classified as positive, the actual invocation must be delayed until its arguments have been computed. As an example, if f( . . . ) is invoked based on a prefix, by the time the result returns, the prefix may have changed, and there is now a new current set of delayed invocations. Some of these such as g(f( . . . )) can be run immediately when f( . . . ) returns.

In some examples, to convert the function invocation to a classification score, the same predicted autoregressive logits for each function invocation are used, for example, with multi-task fine-tuning. If the same invocation appears in multiple plans with different embeddings, these embeddings can be pooled before converting to a score. In some examples, the classifier also takes as an input the log-marginal probability.

In some examples, function invocations are targeted if they include arguments that are currently available. In particular, references to previous calls may only be allowed for calls that have already returned or if they include arguments that indicate that there are no more actions worth taking at this time.

Context for predicting a next action includes one or more of the dialogue history, possibly reduced to a set of types; the current ASR prefix; and the previous function calls that have actually been made as opposed to the calls that have been predicted but classified as not worth making. In some examples, calls are not required to have returned yet, as it may be beneficial to consider launching siblings in parallel.

Previous calls may be de-weighted as an argument to an invocation if the call is estimated to be wrong given the current updated prefix. A previous call may thus be rescored given the current prefix, and that new score incorporated into the score of the proposed invocation.

In some examples, the policy is run repeatedly to choose a sequence of actions, but this process may be suspended once it predicts that there are no more potentially meaningful actions. The process may resume whenever the ASR prefix has changed, a call returns, and/or an assessment of whether any calls are worthwhile has changed.

Returning to FIG. 4, at 460, method 400 includes generating an updated policy from the current policy based on a determined reduction to the execution cost for the predicted complete dataflow program.

In some examples, to train the policy, the execution cost (or alternatively, the reward) of invoking each function compared to not invoking that function is considered. Any suitable cost-sensitive binary classifier can be used, e.g., perceptron, SVM, logistic regression.

For example, based on the current policy, an utterance can be chosen at random and the current policy simulated on it. Various selected interventions change a single action, e.g., adding or suppressing a function invocation at an "action time". The prediction may then continue according to the current policy, and a change in execution cost then determined. In some examples, such measurements are used to improve the policy, with the policy adjusted to prefer actions that lead to a lower cost.

In some examples, the policy is operated with an assumption of a special environment where it can be determined whether an action improves the reward by actually executing a counterfactual. That is, multiple competing actions can be executed from the same state, yielding similar variance reduction as for paired experimental designs.

In some examples, the special environment assumptions include a state where actions do not change the utterance or sequence of prefixes. This can be enacted if the user and ASR system is not shown the actions of the system. Further, the assumption may be made that any action does not change the predictions from each prefix, which can be enacted if the predictor is not shown the return values from those actions. Further, in some examples the special environment assumptions include that a sequence of predicted graphs $\hat{G}_m$ does not change when an action is modified. The only change that occurs responsive to a modified action is a change to a single e(v) value.

However, if changing an action does enact one or more changes on a future graph, importance sampling can be applied. For example, a random subset of alternative actions can be applied at each state, e.g., favoring actions that score most highly under the current policy.

Figure 5:
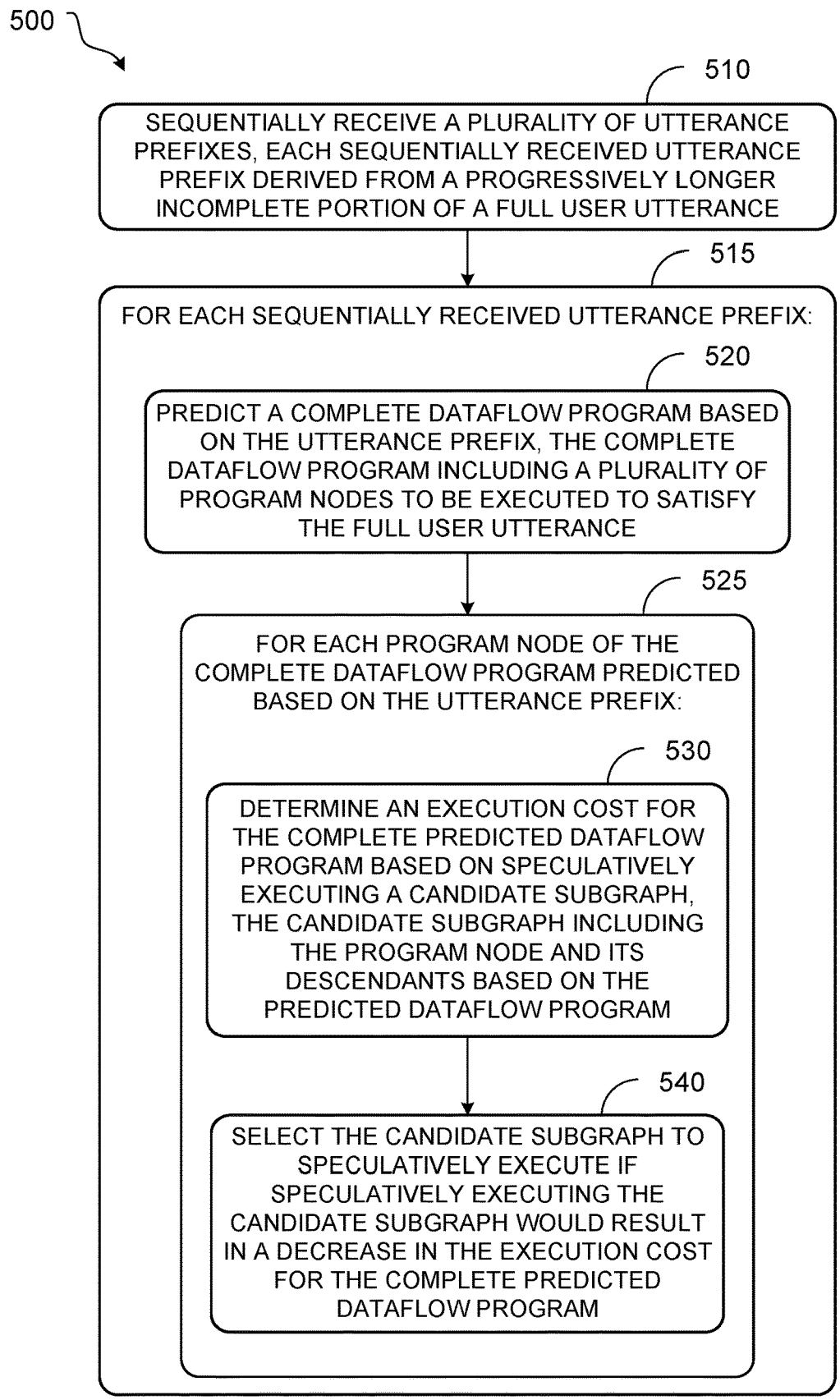
FIG. 5 is a flow diagram illustrating an example method for speculatively executing nodes of a data-flow program.

FIG. 5 is a flow diagram illustrating an example computer-implemented method 500 for speculatively executing nodes of a data-flow program. In some examples, method 500 is executed by a computing system employing numerous models and subsystems, such as an API for calling function invocations, an ASR for translating speech to utterance prefixes, a modeler for predicting full data-flow graphs based on the utterance prefixes, and a translator for predicting future utterance prefixes. In some examples, the computing system employs a trained cost policy, such as a cost policy trained as described with regard to FIG. 4.

At 510, method 500 includes sequentially receiving a plurality of utterance prefixes, each sequentially received utterance prefix derived from a progressively longer incomplete portion of a full user utterance. In some examples, the output of the ASR, e.g., utterance prefix, is received.

At 515, actions are described that apply to each sequentially received utterance prefix. In some examples, the system predicts programs responsive to the receipt of each partial utterance and/or utterance prefix from the ASR.

At 520, method 500 includes predicting a complete dataflow program based on the utterance prefix, the complete dataflow program including a plurality of program nodes to be executed to satisfy the full user utterance. As described with regard to FIG. 4, in some examples, the complete dataflow program is predicted directly from the utterance prefix, or is predicted after first predicting a full user utterance based on the received utterance prefixes and any available context information.

At 525, actions are described that apply to each program node of the complete dataflow program predicted based on the utterance prefix. At 530, method 500 includes determining an execution cost for the complete dataflow program based on speculatively executing a candidate subgraph, the candidate subgraph including the program node and its descendants based on the predicted dataflow program. For example, the execution cost for the complete dataflow program may be determined for scenarios where the candidate subgraph is speculatively executed, and where the candidate subgraph is not executed until further information is received, e.g., a next utterance prefix. As described with regard to FIG. 4, in some examples, the execution cost is based on one or more of a latency, a total computing cost, and a likelihood distribution indicating a probability that the candidate subgraph will be executed in the final dataflow program.

At 540, method 500 includes selecting the candidate node to speculatively execute if speculatively executing the candidate subgraph would result in a decrease in the execution cost for the complete predicted dataflow program. In some examples, the candidate subgraph is speculatively executed if doing so would result in an above threshold decrease in the execution cost for the complete predicted dataflow program, e.g., decrease a latency by more than a threshold number of milliseconds. Conversely, the candidate subgraph may not be speculatively executed if it is unlikely to be executed in the final dataflow program, even if speculative execution would decrease latency in the scenarios where the candidate subgraph were ultimately invoked.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
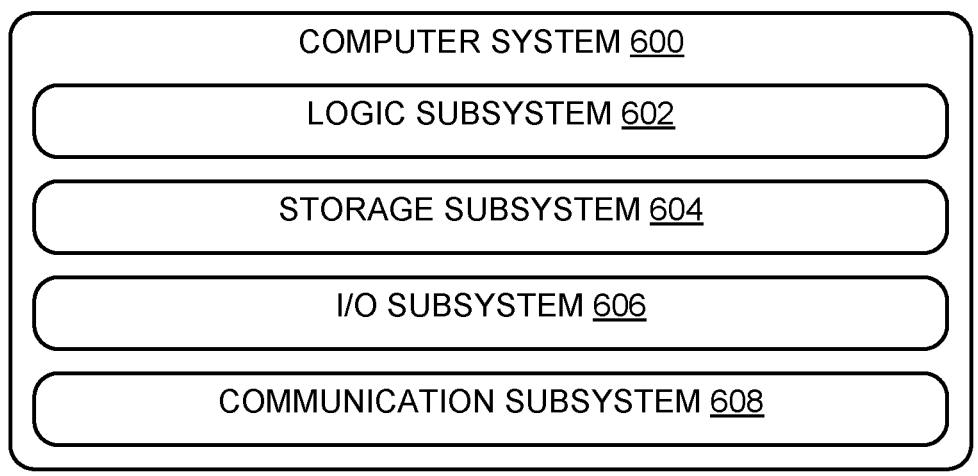
FIG. 6 shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices, e.g., smart phone, virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include an input/output subsystem 606, communication subsystem 608, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component, e.g., software application executed by a computer processor, cooperating with a remote component, e.g., cloud computing service provided by a network of server computers. The software and/or other instructions that give a particular machine its functionality may optionally be saved as one or more unexecuted modules on one or more suitable storage devices. For example, the previously-trained code-generation machine, previously-trained relevance detection machine, and/or error-handling execution machine are examples of machines according to the present disclosure.

Machines may be implemented using any suitable combination of state-of-the-art and/or future machine learning (ML), artificial intelligence (AI), and/or natural language processing (NLP) techniques. For example, the previously-trained code-generation machine and/or previously-trained relevance detection machine may incorporate any suitable ML, AI, and/or NLP techniques, including any suitable language models.

Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions, e.g., with regard to training data, and/or with regard to an objective function. Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The previously-trained code-generation machine and/or previously-trained relevance detection machine may incorporate any suitable language models. Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms, e.g., confidence values resulting from such processing. In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models, e.g., wav2letter and/or word2vec. Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech.

The language model may be used in conjunction with an acoustical model configured to assess, for a candidate word and an audio signal, a confidence that the candidate word is included in speech in the audio signal based on acoustical features of the word, e.g., mel-frequency cepstral coefficients, formants, etc. Optionally, in some examples, the language model may incorporate the acoustical model, e.g., assessment and/or training of the language model may be based on the acoustical model. The acoustical model defines a mapping between acoustic signals and basic sound units such as phonemes, e.g., based on labelled speech. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters. The acoustical model may be trained to recognize the mapping between acoustic signals and sound units based on training with labelled audio data. For example, the acoustical model may be trained based on labelled audio data comprising speech and corrected text, in order to learn the mapping between the speech signals and sound units denoted by the corrected text. Accordingly, the acoustical model may be continually improved to improve its utility for correctly recognizing speech.

In some examples, in addition to statistical models, neural networks, and/or acoustical models, the language model may incorporate any suitable graphical model, e.g., a hidden Markov model (HMM) or a conditional random field (CRF). The graphical model may utilize statistical features, e.g., transition probabilities, and/or confidence values to determine a probability of recognizing a word, given the speech and/or other words recognized so far. Accordingly, the graphical model may utilize the statistical features, previously trained machine learning models, and/or acoustical models to define transition probabilities between states represented in the graphical model.

When included, input/output subsystem 606 may comprise one or more displays, which may be used to present a visual representation of data held by storage subsystem 604. This visual representation may take the form of a graphical user interface (GUI). Input/output subsystem 606 may include one or more display devices utilizing virtually any type of technology. In some implementations, display subsystem may include one or more virtual-, augmented-, or mixed reality displays. When included, input/output subsystem 606 may further comprise one or more speakers configured to output speech, e.g., to present an audible representation of data held by storage subsystem 604, such as automated assistant responses.

When included, input/output subsystem 606 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 608 may be configured to communicatively couple computing system 600 with one or more other computing devices. Communication subsystem 608 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to seem one example, a computer-implemented method comprises sequentially receiving a plurality of utterance prefixes, each sequentially received utterance prefix derived from a progressively longer incomplete portion of a full user utterance; for each sequentially received utterance prefix, predicting a complete dataflow program based on the utterance prefix, the complete dataflow program including a plurality of program nodes to be executed to satisfy the full user utterance; and selecting, from the predicted complete dataflow program, one or more program nodes to speculatively execute based on at least the utterance prefix. The technical effect of speculatively executing one or more program nodes based on at least the utterance prefix is an increased user interaction performance due to at least reduced latency in generating a response. In such an example, or any other example, the computer-implemented method additionally or alternatively comprises speculatively executing a selected program node prior to receiving a final version of the full user utterance. In any of the preceding examples, or any other example, execution of the selected program node is additionally or alternatively performed after arguments of the selected program node have returned from execution provided the selected program node remains selected based on subsequently received utterance prefixes, subsequently predicted complete dataflow programs, and/or subsequently understood context. In any of the preceding examples, or any other example, the complete dataflow program is additionally or alternatively predicted based also on a context of a dialogue history. In any of the preceding examples, or any other example, the complete dataflow program is additionally or alternatively predicted by a machine learning model previously trained with training data including pairs of training utterance prefixes and training complete dataflow programs. In any of the preceding examples, or any other example, the machine learning model is additionally or alternatively previously trained to at least locally maximize a product based on at least: a sequence of actions, each of which contributes to adding a node and/or a sequence of edges to the complete dataflow program; a context of a dialogue history; and the utterance prefix. In any of the preceding examples, or any other example, the complete dataflow program is additionally or alternatively predicted by hallucinating a predicted full utterance from the utterance prefix with a previously-trained language model and predicting the complete dataflow program with a machine learning model previously trained with training data including pairs of training full utterances and training complete dataflow programs. In any of the preceding examples, or any other example, the previously-trained language model is additionally or alternatively a Transformer-based language model. In any of the preceding examples, or any other example, selecting one or more program nodes to speculatively execute is additionally or alternatively based at least on a probability the program node will eventually be executed. In any of the preceding examples, or any other example, selecting program nodes additionally or alternatively includes, for each candidate node of the complete dataflow program predicted based on the utterance prefix, calculating a conditional probability of a candidate subgraph including the candidate node and its descendants; and selecting the candidate node if the conditional probability is greater than a threshold. In any of the preceding examples, or any other example, calculating the conditional probability of the candidate subgraph additionally or alternatively includes multiplying predicted probabilities of all relevant actions responsible for building the candidate subgraph. In any of the preceding examples, or any other example, each of the plurality of utterance prefixes are additionally or alternatively received from a speech to text module.

In another example, a computer-implemented method comprises sequentially receiving a plurality of utterance prefixes, each sequentially received utterance prefix derived from a progressively longer incomplete portion of a full user utterance; for each sequentially received utterance prefix, predicting a complete dataflow program comprising a plurality of program nodes to be executed to satisfy the full user utterance; and selecting from the predicted complete dataflow program, based on a current policy, one or more program nodes to speculatively execute based on at least the utterance prefix, selecting from the predicted complete dataflow program, based on the current policy, one or more program nodes to not execute until at least a next utterance prefix is received; responsive to receiving the full user utterance, determining a change in execution cost for the predicted complete dataflow program based on a change in which program nodes were speculatively executed and which program nodes were not executed; and generating an updated policy from the current policy based on a determined reduction to the execution cost for the predicted complete dataflow program. The technical effect of updating a policy based on a determined reduction to the execution cost is a reduction in consumption of computing resources. In such an example, or any other example, predicting a plurality of program nodes to be executed to satisfy the full user utterance additionally or alternatively includes mapping the received utterance prefix to a plurality of possible full user utterances; and mapping each possible full user utterance to one or more possible complete dataflow programs. In any of the preceding examples, or any other example, predicting a plurality of program nodes to be executed to satisfy the full user utterance additionally or alternatively includes mapping the received utterance prefix to one or more possible complete dataflow programs. In any of the preceding examples, or any other example, predicting a plurality of program nodes to be executed to satisfy the full user utterance additionally or alternatively includes directly mapping the received utterance prefix to a set of program nodes. In any of the preceding examples, or any other example, the change in execution cost is additionally or alternatively based on one or more of an expected latency, a total computing cost, and a likelihood distribution indicating a probability that the program node will appear in a final dataflow program.

In yet another example, a computer-implemented method, comprises sequentially receiving a plurality of utterance prefixes, each sequentially received utterance prefix derived from a progressively longer incomplete portion of a full user utterance; for each sequentially received utterance prefix, predicting a complete dataflow program based on the utterance prefix, the complete dataflow program including a plurality of program nodes to be executed to satisfy the full user utterance; and for each program node of the complete dataflow program predicted based on the utterance prefix, determining an execution cost for the complete dataflow program based on speculatively executing a candidate subgraph, the candidate subgraph including the program node and its descendants based on the predicted dataflow program; and selecting the candidate node to speculatively execute if speculatively executing the candidate subgraph would result in a decrease in the execution cost for the complete predicted dataflow program. The technical effect of selecting candidate nodes to speculatively execute based on a decrease in the execution cost for the complete predicted dataflow program includes at least improved human-computer interactions, as the latency of generating a response is decreased. In such an example, or any other example, determining the execution cost for the complete dataflow program additionally or alternatively includes determining an execution cost for one or more scenarios where the candidate subgraph is speculatively executed, and for one or more scenarios where the candidate subgraph is not executed until further information is received. In any of the preceding examples, or any other example, the computer-implemented method additionally or alternatively comprises not executing the candidate subgraph until at least a next utterance prefix is received if the likelihood of executing the candidate subgraph in the complete predicted dataflow program is less than a likelihood threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method, comprising:
sequentially receiving, from an automatic speech recognition system, a plurality of utterance prefixes, each sequentially received utterance prefix derived from a progressively longer incomplete portion of a full user utterance;
for each sequentially received utterance prefix:
predicting a complete dataflow program based on the utterance prefix, the complete dataflow program including a plurality of program nodes to be executed to satisfy the full user utterance, each program node comprising either a function invocation or a constant value; and
selecting, from the predicted complete dataflow program, one or more program nodes comprising at least one function invocation to speculatively execute based on at least the utterance prefix.

2. The computer-implemented method of claim 1, further comprising speculatively executing a selected program node prior to receiving a final version of the full user utterance.

3. The computer-implemented method of claim 2, wherein execution of the selected program node is performed after arguments of the selected program node have returned from execution provided the selected program node remains selected based on subsequently received utterance prefixes, subsequently predicted complete dataflow programs, and/or subsequently understood context.

4. The computer-implemented method of claim 1, wherein the complete dataflow program is predicted based also on a context of a dialogue history.

5. The computer-implemented method of claim 1, wherein the complete dataflow program is predicted by a machine learning model previously trained with training data including pairs of training utterance prefixes and training complete dataflow programs.

6. The computer-implemented method of claim 5, wherein the machine learning model is previously trained to at least locally maximize a product based on at least:

a sequence of actions, each of which contributes to adding a node and/or a sequence of edges to the complete dataflow program;
a context of a dialogue history; and
the utterance prefix.

7. The computer-implemented method of claim 1, wherein the complete dataflow program is predicted by hallucinating a predicted full utterance from the utterance prefix with a previously-trained language model and predicting the complete dataflow program with a machine learning model previously trained with training data including pairs of training full utterances and training complete dataflow programs.

8. The computer-implemented method of claim 7, wherein the previously-trained language model is a Transformer-based language model.

9. The computer-implemented method of claim 1, wherein selecting one or more program nodes to speculatively execute is based at least on a probability the program node will eventually be executed.

10. The computer-implemented method of claim 9, wherein selecting program nodes includes:
for each candidate node of the complete dataflow program predicted based on the utterance prefix:
calculating a conditional probability of a candidate subgraph including the candidate node and its descendants; and
selecting the candidate node if the conditional probability is greater than a threshold.

11. The computer-implemented method of claim 10, wherein calculating the conditional probability of the candidate subgraph includes multiplying predicted probabilities of all relevant actions responsible for building the candidate subgraph.

12. The computer-implemented method of claim 1, wherein each of the plurality of utterance prefixes are received from a speech to text module.

13. A computer-implemented method, comprising:
sequentially receiving, from an automatic speech recognition system, a plurality of utterance prefixes, each sequentially received utterance prefix derived from a progressively longer incomplete portion of a full user utterance;
for each sequentially received utterance prefix:
predicting a complete dataflow program comprising a plurality of program nodes to be executed to satisfy the full user utterance; and
selecting from the predicted complete dataflow program, based on a current policy for speculatively executing program nodes based on execution costs, one or more program nodes to speculatively execute further based on at least the utterance prefix,
selecting from the predicted complete dataflow program, based on the current policy, one or more program nodes to not execute until at least a next utterance prefix is received;
responsive to receiving the full user utterance, determining a change in execution cost for the predicted complete dataflow program based on a change in which program nodes were speculatively executed and which program nodes were not executed; and
generating an updated policy from the current policy based on a determined reduction to the execution cost for the predicted complete dataflow program, the updated policy replacing the current policy.

14. The computer-implemented method of claim 13, wherein predicting a plurality of program nodes to be executed to satisfy the full user utterance includes:
mapping the received utterance prefix to a plurality of possible full user utterances; and
mapping each possible full user utterance to one or more possible complete dataflow programs.

15. The computer-implemented method of claim 13, wherein predicting a plurality of program nodes to be executed to satisfy the full user utterance includes mapping the received utterance prefix to one or more possible complete dataflow programs.

16. The computer implemented method of claim 13, wherein predicting a plurality of program nodes to be executed to satisfy the full user utterance includes directly mapping the received utterance prefix to a set of program nodes.

17. The computer implemented method of claim 13, wherein the change in execution cost is based on one or more of an expected latency, a total computing cost, and a likelihood distribution indicating a probability that the program node will appear in a final dataflow program.

18. A computer-implemented method, comprising:
sequentially receiving, from an automatic speech recognition system, a plurality of utterance prefixes, each sequentially received utterance prefix derived from a progressively longer incomplete portion of a full user utterance;
for each sequentially received utterance prefix:
predicting a complete dataflow program based on the utterance prefix, the complete dataflow program including a plurality of program nodes to be executed to satisfy the full user utterance; and
for each program node of the complete dataflow program predicted based on the utterance prefix:
determining a first execution cost for the predicted complete dataflow program;
determining a second execution cost for the predicted complete dataflow program based on speculatively executing a candidate subgraph, the candidate subgraph including the program node and its descendants based on the predicted complete dataflow program; and
selecting the program node to speculatively execute if speculatively executing the candidate subgraph would result in a decrease in overall execution cost for the predicted complete dataflow program based on the first execution cost and the second execution cost.

19. The computer-implemented method of claim 18, wherein determining the overall execution cost for the predicted complete dataflow program includes determining an execution cost for one or more scenarios where the candidate subgraph is speculatively executed, and for one or more scenarios where the candidate subgraph is not executed until further information is received.

20. The computer-implemented method of claim 18, further comprising:
not executing the candidate subgraph until at least a next utterance prefix is received if the likelihood of executing the candidate subgraph in the predicted complete dataflow program is less than a likelihood threshold.

* * * * *